(12) United States Patent
You et al.

(10) Patent No.: US 11,070,344 B2
(45) Date of Patent: Jul. 20, 2021

(54) METHOD AND USER EQUIPMENT FOR RECEIVING DOWNLINK CHANNEL, AND METHOD AND BASE STATION FOR TRANSMITTING DOWNLINK CHANNEL

(71) Applicant: LG ELECTRONICS INC., Seoul (KR)

(72) Inventors: Hyangsun You, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/063,202

(22) PCT Filed: Jan. 3, 2017

(86) PCT No.: PCT/KR2017/000047
§ 371 (c)(1),
(2) Date: Jun. 15, 2018

(87) PCT Pub. No.: WO2017/122959
PCT Pub. Date: Jul. 20, 2017

(65) Prior Publication Data
US 2018/0375636 A1 Dec. 27, 2018

Related U.S. Application Data

(60) Provisional application No. 62/278,431, filed on Jan. 13, 2016, provisional application No. 62/328,017, (Continued)

(51) Int. Cl.
*H04L 5/00* (2006.01)
*H04L 1/18* (2006.01)
(Continued)

(52) U.S. Cl.
CPC .......... *H04L 5/0092* (2013.01); *H04L 1/1812* (2013.01); *H04L 5/001* (2013.01);
(Continued)

(58) Field of Classification Search
CPC ... H04L 5/0092; H04L 1/1812; H04L 5/0048; H04L 5/001; H04L 5/0055; H04L 5/0053;
(Continued)

(56) References Cited

U.S. PATENT DOCUMENTS

2012/0052899 A1* 3/2012 Wang ................. H04W 52/226
455/513
2012/0128039 A1 5/2012 Kim et al.
(Continued)

FOREIGN PATENT DOCUMENTS

KR 1020050067181 6/2005
KR 101265634 5/2013
(Continued)

OTHER PUBLICATIONS

3GPP TS 36.213 E-UTRA Physical layer procedures v12.7.0 (Oct. 2015) (Year: 2015).*
(Continued)

*Primary Examiner* — Un C Cho
*Assistant Examiner* — Yu-Wen Chang
(74) *Attorney, Agent, or Firm* — Lee Hong Degerman Kang & Waimey

(57) ABSTRACT

A method and apparatus for transmitting/receiving a downlink channel in a wireless communication system are provided. A physical downlink control channel (PDCCH) can be transmitted using one or more resource element groups (REGs) among a plurality of REGs in a transmission time interval (TTI). Each of the plurality of REGs occupies 12 consecutive resource elements (REs) belonging to a physical resource block (PRB) along a frequency domain within an
(Continued)

orthogonal frequency division multiplexing (OFDM) symbol with or without a reference signal (RS) in the TTI.

16 Claims, 16 Drawing Sheets

Related U.S. Application Data filed on Apr. 27, 2016, provisional application No. 62/409,851, filed on Oct. 18, 2016.

(51) Int. Cl.
*H04W 72/04* (2009.01)
*H04W 74/08* (2009.01)

(52) U.S. Cl.
CPC .......... *H04L 5/0044* (2013.01); *H04L 5/0048* (2013.01); *H04L 5/0053* (2013.01); *H04L 5/0055* (2013.01); *H04W 72/0406* (2013.01); *H04W 74/0808* (2013.01); *H04L 5/0007* (2013.01)

(58) Field of Classification Search
CPC ............... H04L 5/0044; H04L 5/0007; H04W 72/0406; H04W 74/0808
See application file for complete search history.

(56) References Cited

U.S. PATENT DOCUMENTS

| | | | |
|---|---|---|---|
| 2013/0039284 A1 | 2/2013 | Marinier et al. | |
| 2013/0039291 A1* | 2/2013 | Blankenship | H04L 5/0055 370/329 |
| 2013/0223332 A1* | 8/2013 | Wu | H04L 5/0048 370/315 |
| 2013/0286966 A1* | 10/2013 | Chung | H04W 72/0406 370/329 |
| 2013/0294362 A1* | 11/2013 | Xu | H04L 5/0053 370/329 |
| 2014/0071911 A1* | 3/2014 | Horiuchi | H04L 5/0053 370/329 |
| 2014/0328260 A1 | 11/2014 | Papasakellariou et al. | |
| 2015/0282127 A1 | 10/2015 | Park et al. | |
| 2017/0111894 A1* | 4/2017 | Chen | H04L 5/0053 |
| 2017/0181169 A1* | 6/2017 | Choi | H04L 5/0053 |
| 2018/0192420 A1* | 7/2018 | Hao | H04W 72/0446 |
| 2018/0310282 A1* | 10/2018 | Shi | H04W 72/042 |

FOREIGN PATENT DOCUMENTS

| | | |
|---|---|---|
| KR | 1020140018978 | 2/2014 |
| KR | 1020140115326 | 9/2014 |
| KR | 1020140120249 | 10/2014 |

OTHER PUBLICATIONS

PCT International Application No. PCT/KR2017/000047, Written Opinion of the International Searching Authority dated Apr. 11, 2017, 8 pages.
Panasonic, "Summary of Informal Email Discussion on other M-PDCCH issues", 3GPP TSG RAN WG1 Meeting #83, R1-157478, Nov. 2015, 14 pages.
Ericsson, "M-PDCCH configuration for MTC", 3GPP TSG RAN WG1 Meeting #83, R1-156411, Nov. 2015, 2 pages.
ZTE, "Remaining issues on M-PDCCH for MTC enhancement", 3GPP TSG RAN WG1 Meeting #83, R1-156664, Nov. 2015, 6 pages.
CATT, "Remaining issues on M-PDCCH design", 3GPP TSG RAN WG1 Meeting #82bis, R1-155167, Oct. 2015, 4 pages.
European Patent Office Application No. 17738588.7, Search Report dated Jul. 19, 2019, 9 pages.

\* cited by examiner

[Fig. 1]
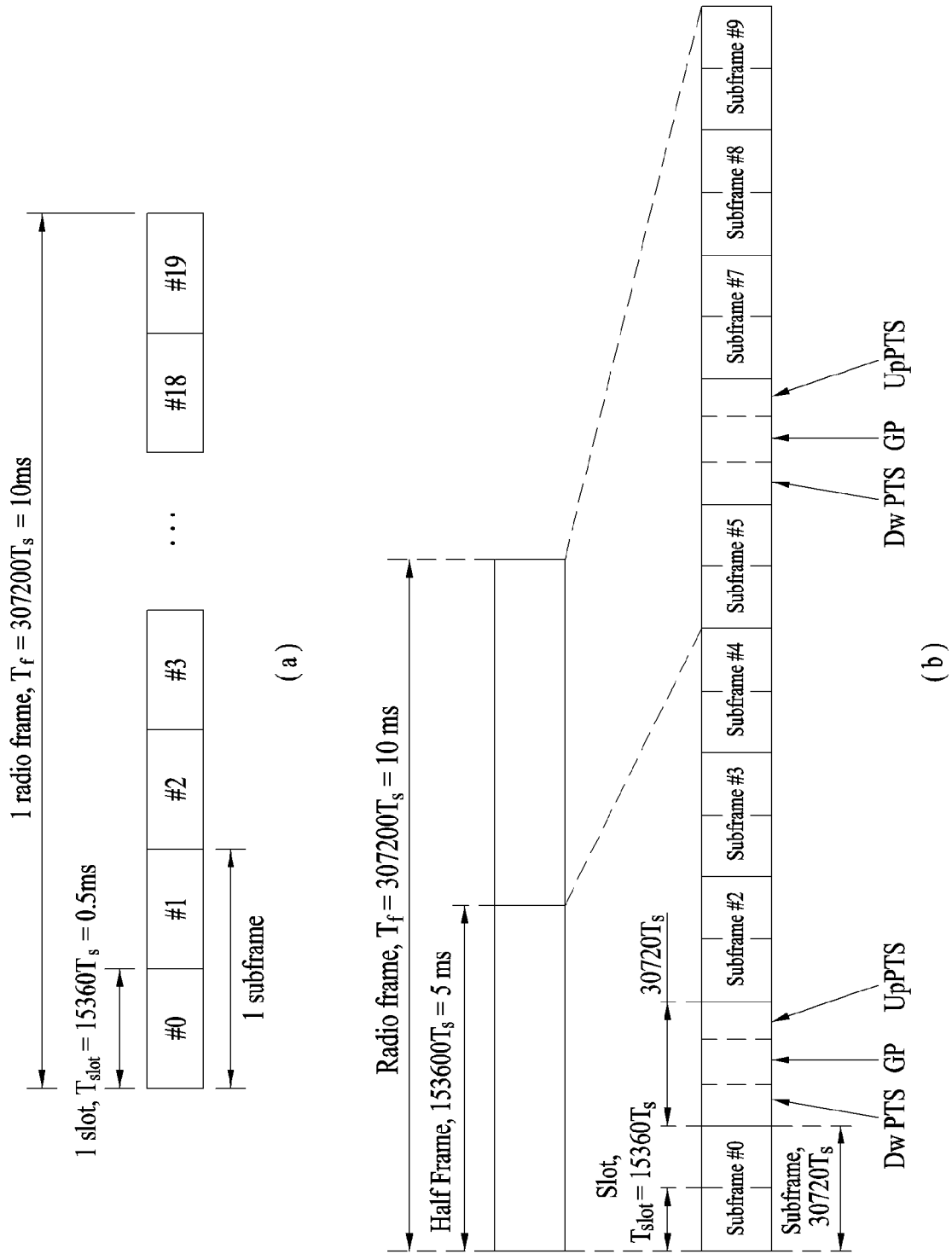

[Fig. 2]
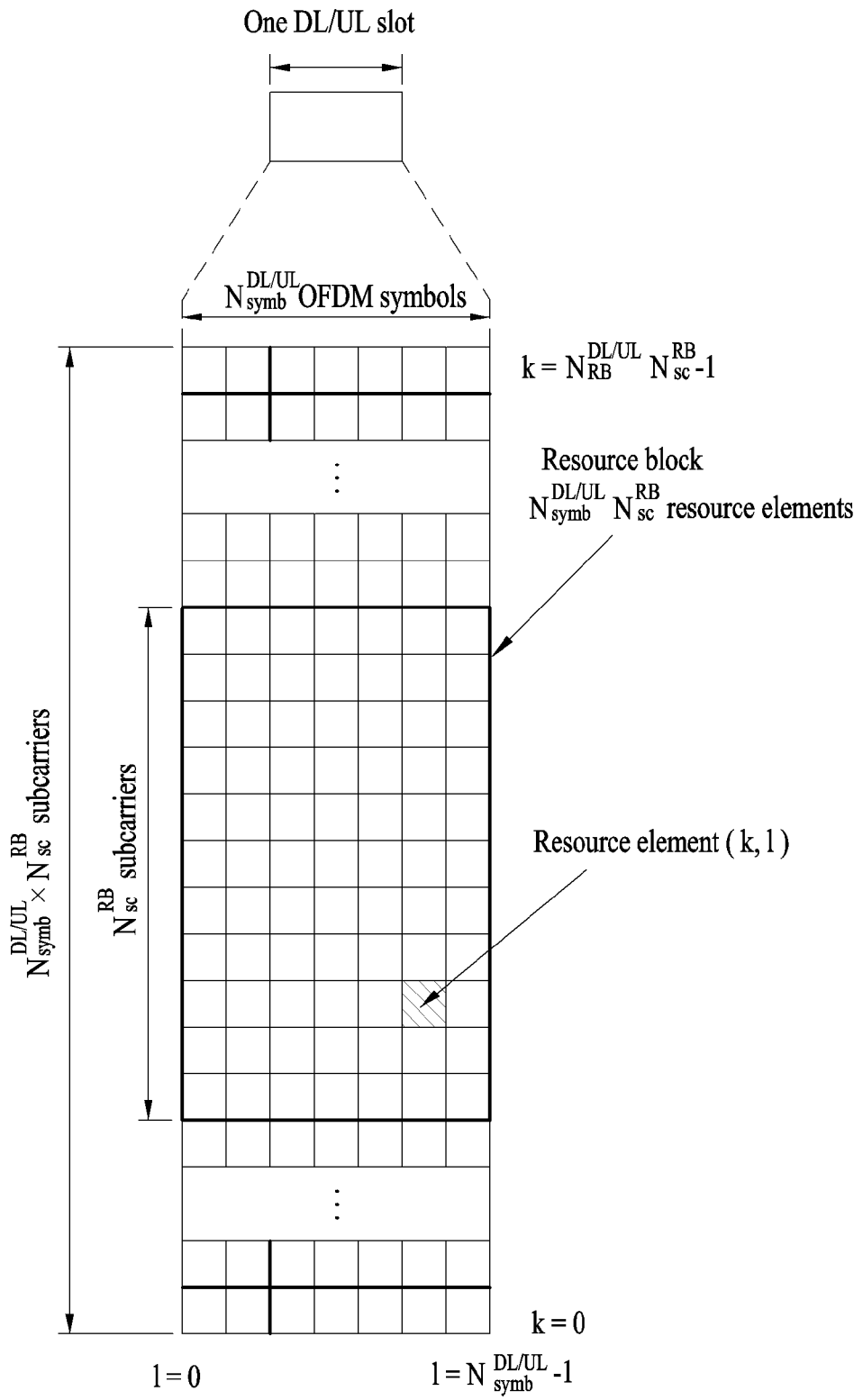

[Fig. 3]
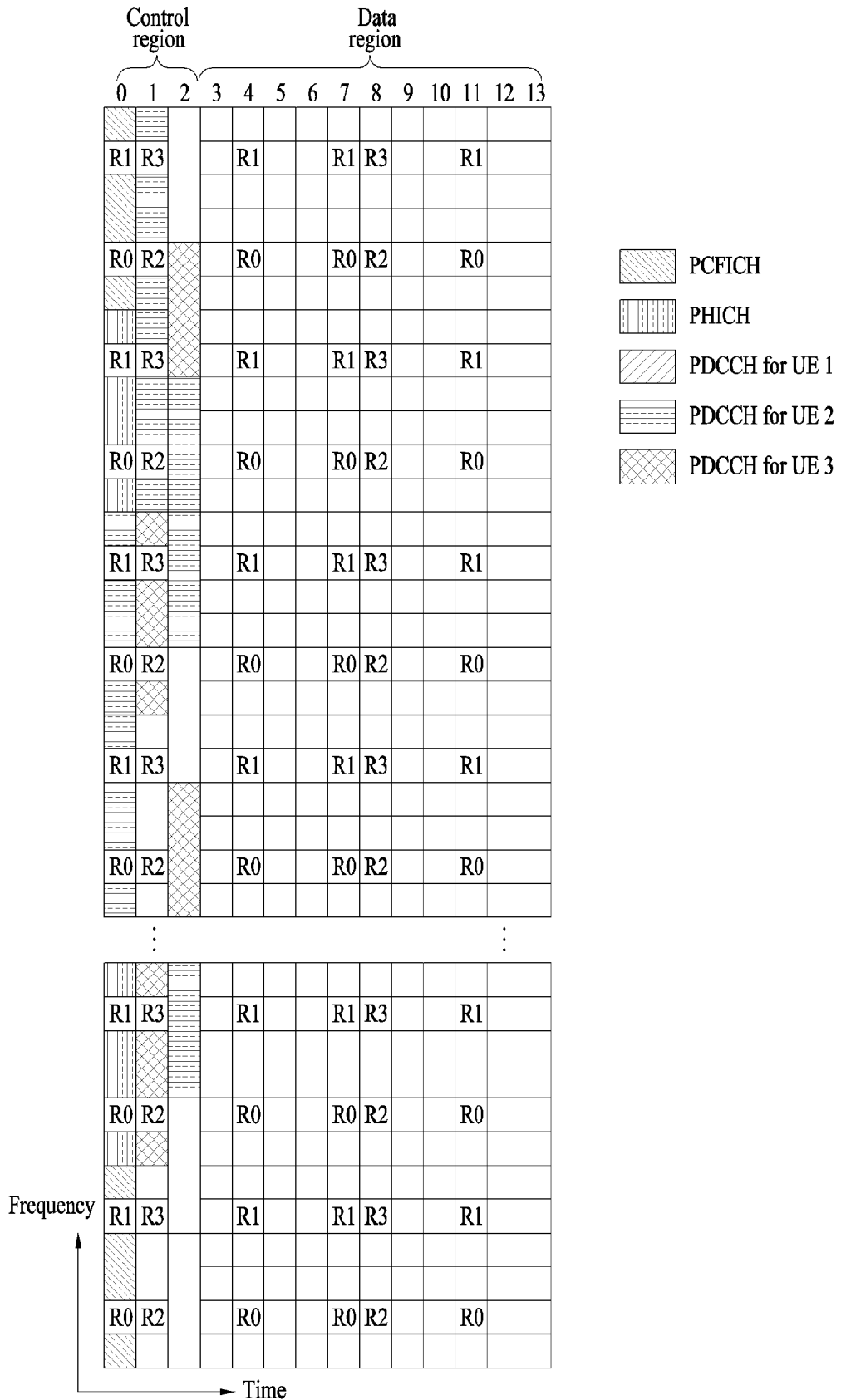

[Fig. 4]
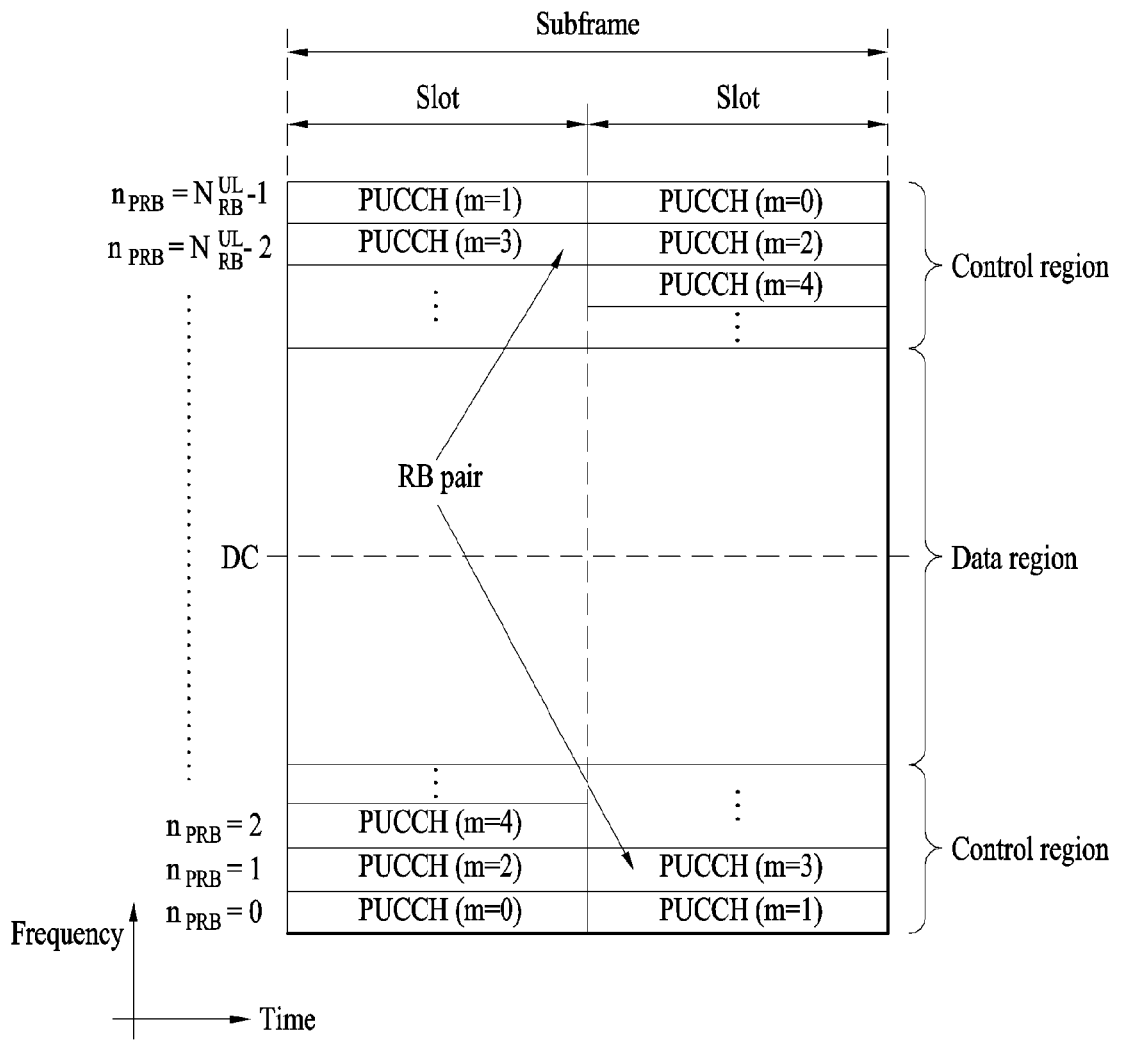

[Fig. 5]
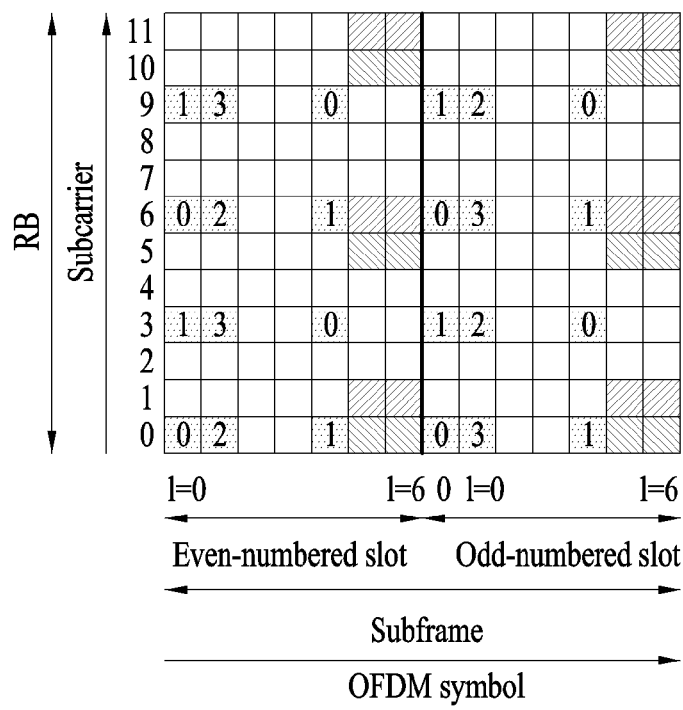
| p | RE occupied by CRS of port p ( p∈0, p∈0,1 or p∈0,1,2,3 ) |
| ▨ | RE occupied by UE-RS of port(s) p ( p∈7, p∈8, p∈7,8 or p∈7,8,11,13 ) |
| ▩ | RE occupied by UE-RS of port(s) p ( p∈9, p∈10, p∈9,10 or p∈9,10,12,14 ) |
[Fig. 6]
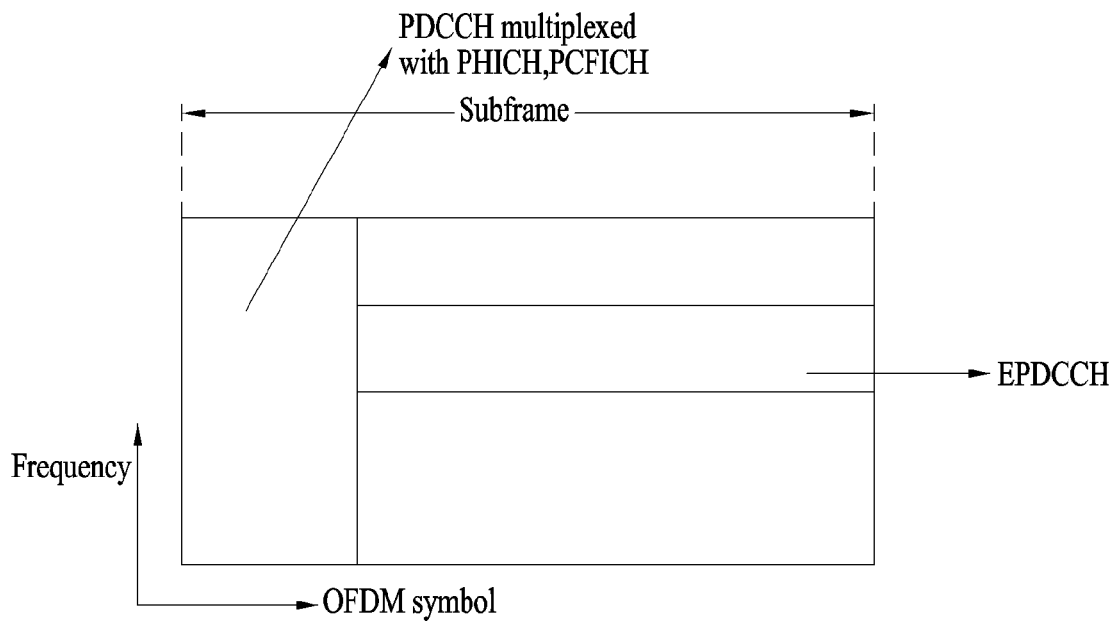

[Fig. 7]
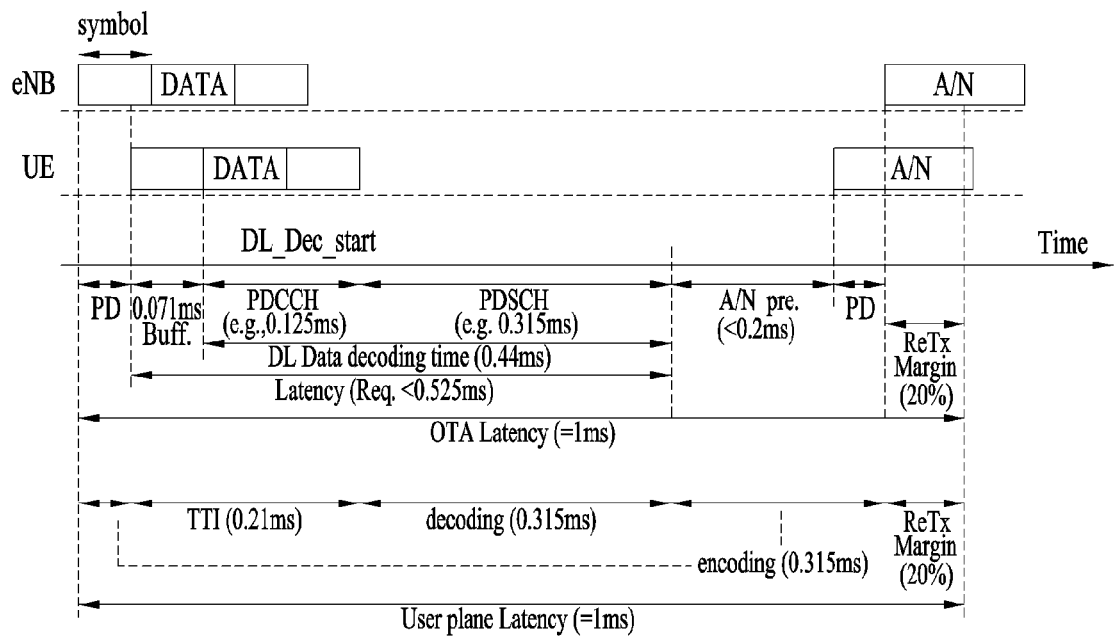
[Fig. 8]
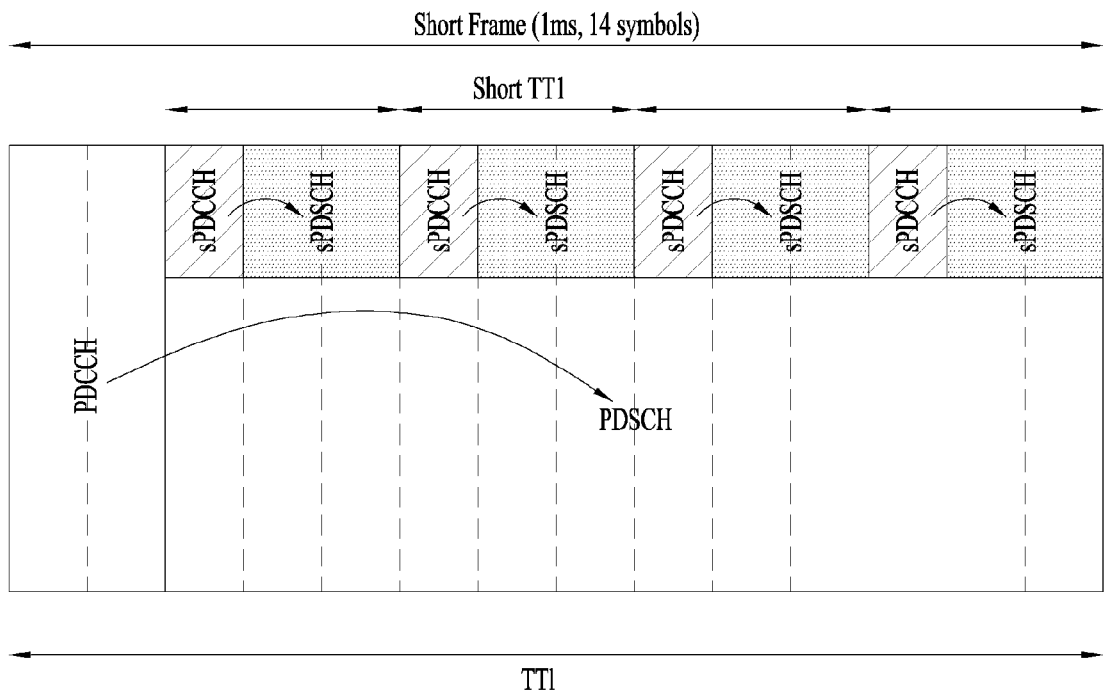

[Fig. 9]
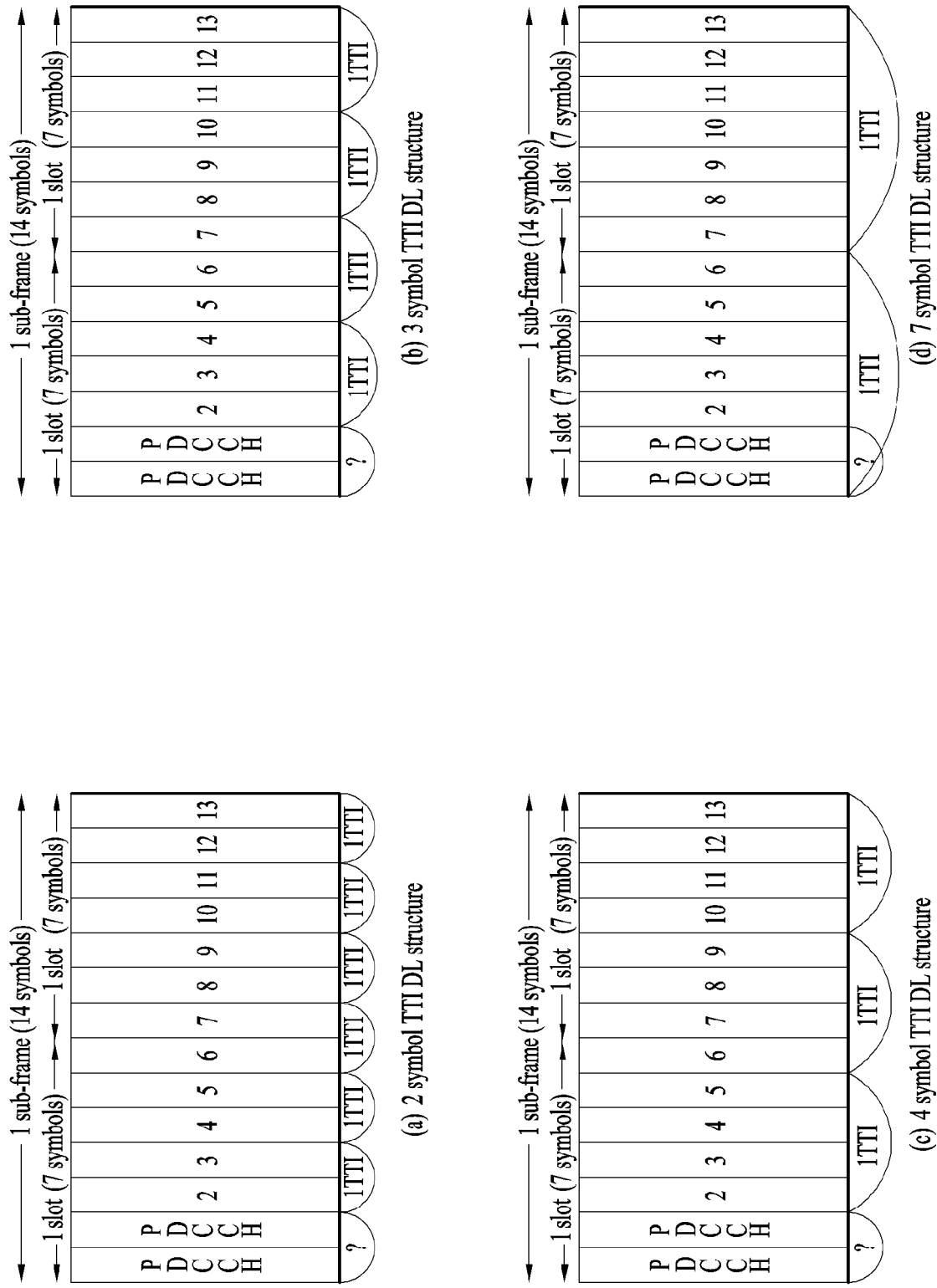

[Fig. 10]
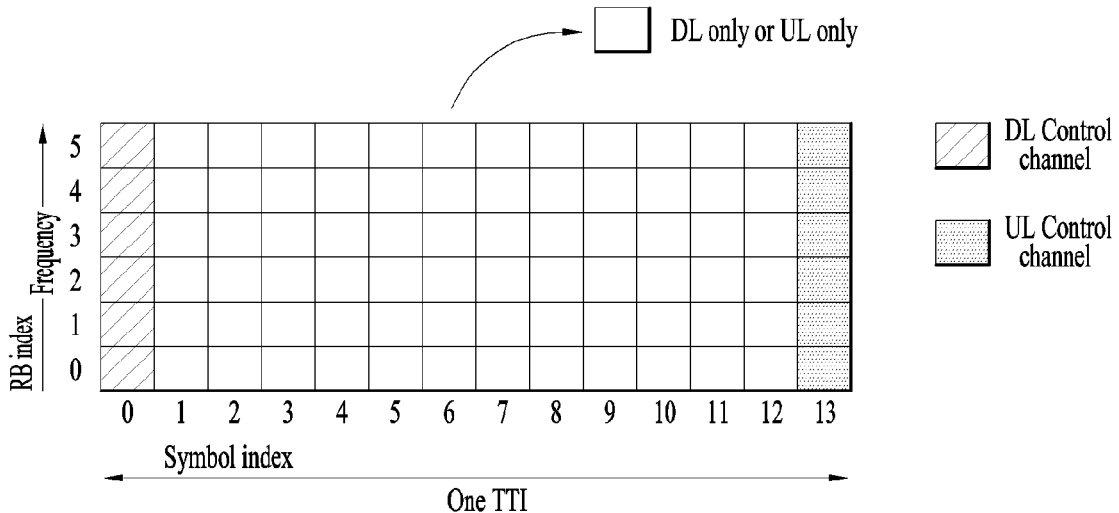
[Fig. 11]
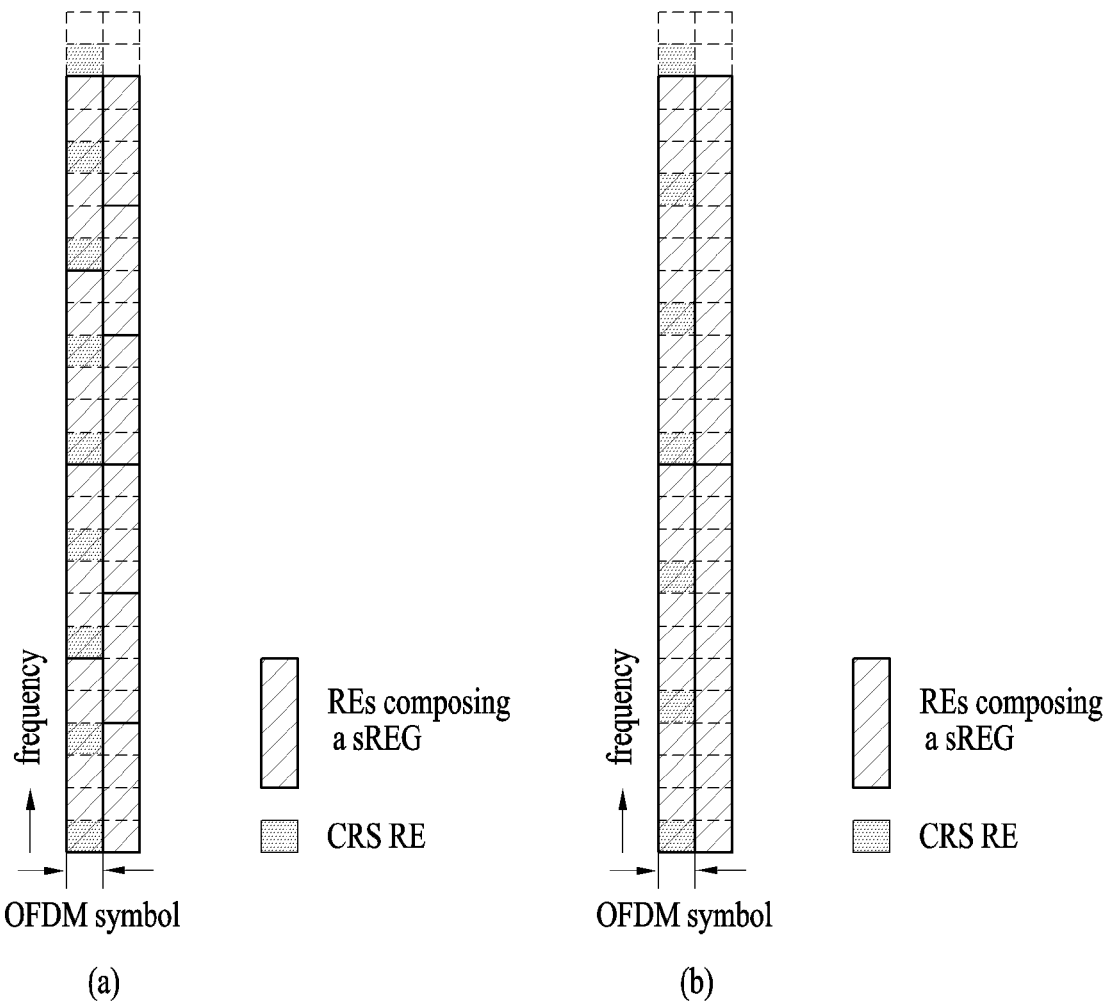

[Fig. 12]
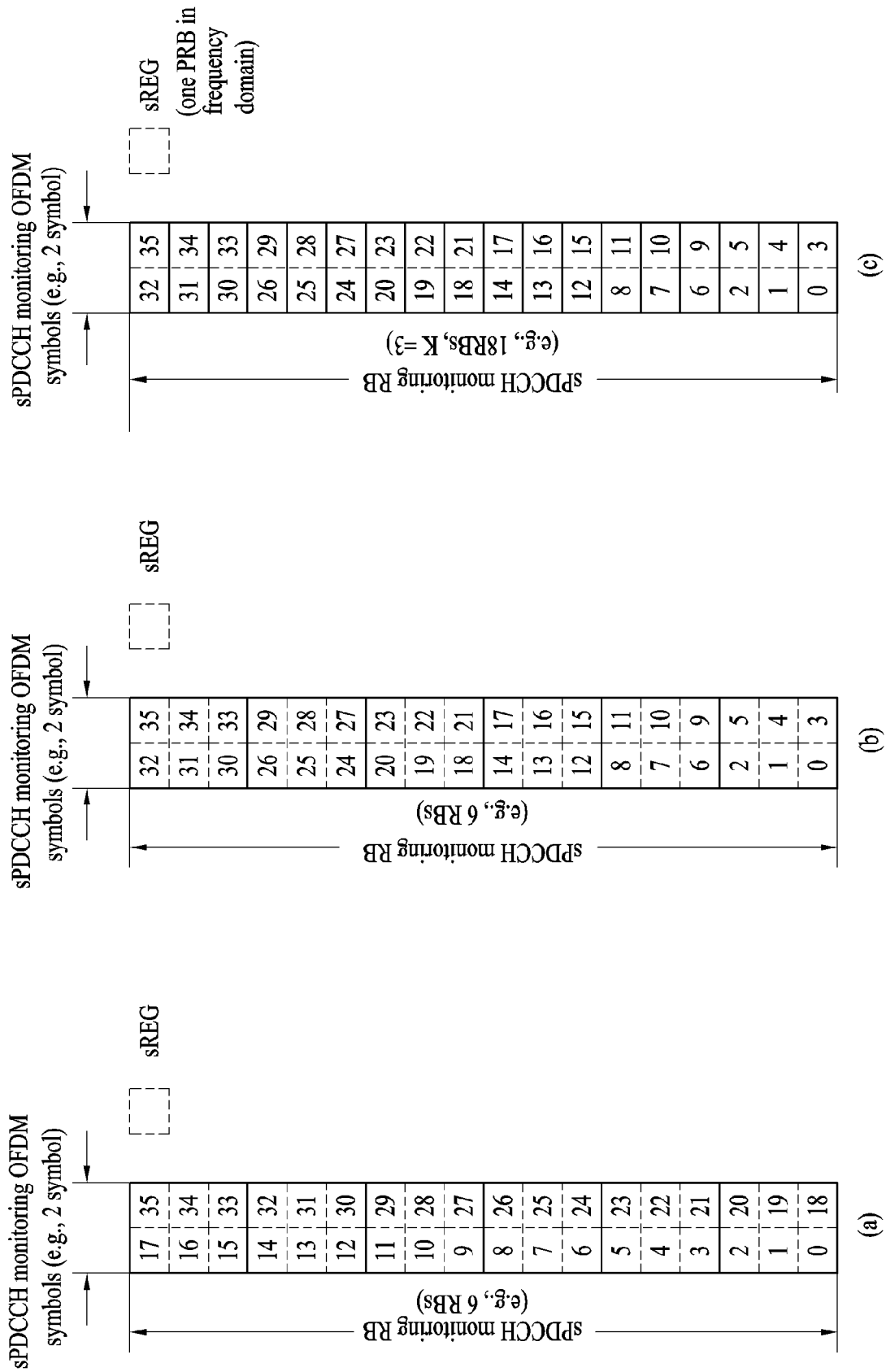

[Fig. 13]
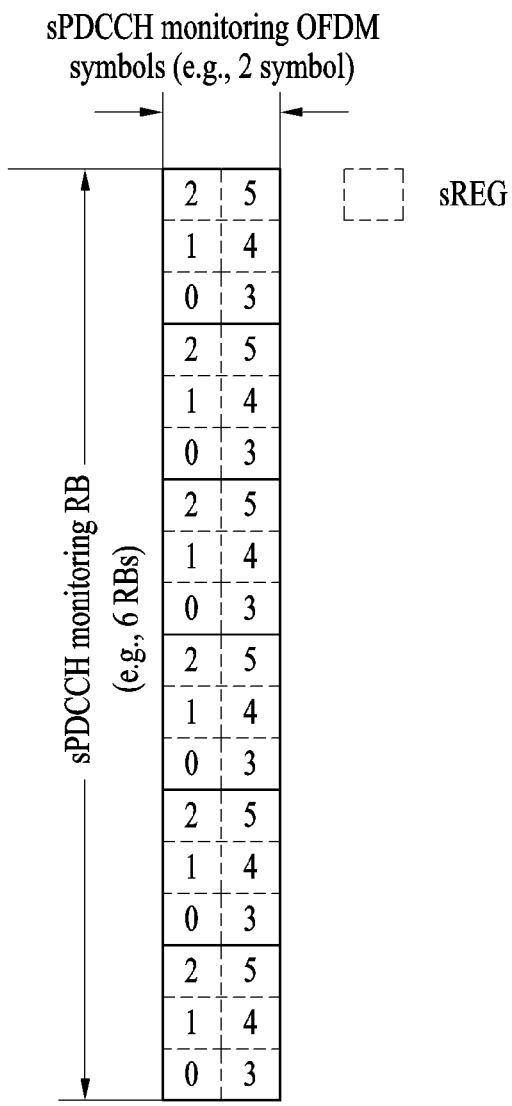

[Fig. 14]
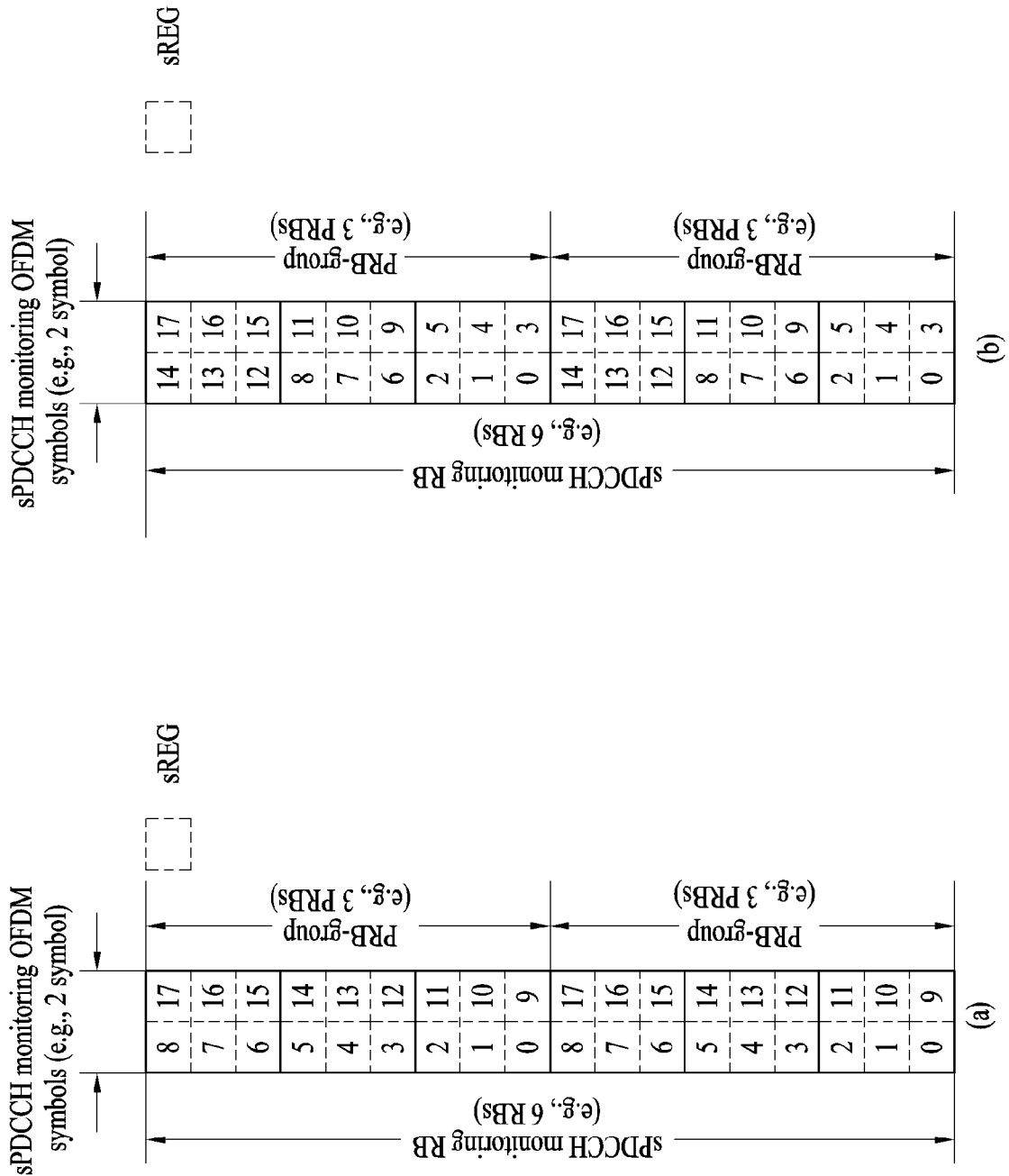

[Fig. 15]
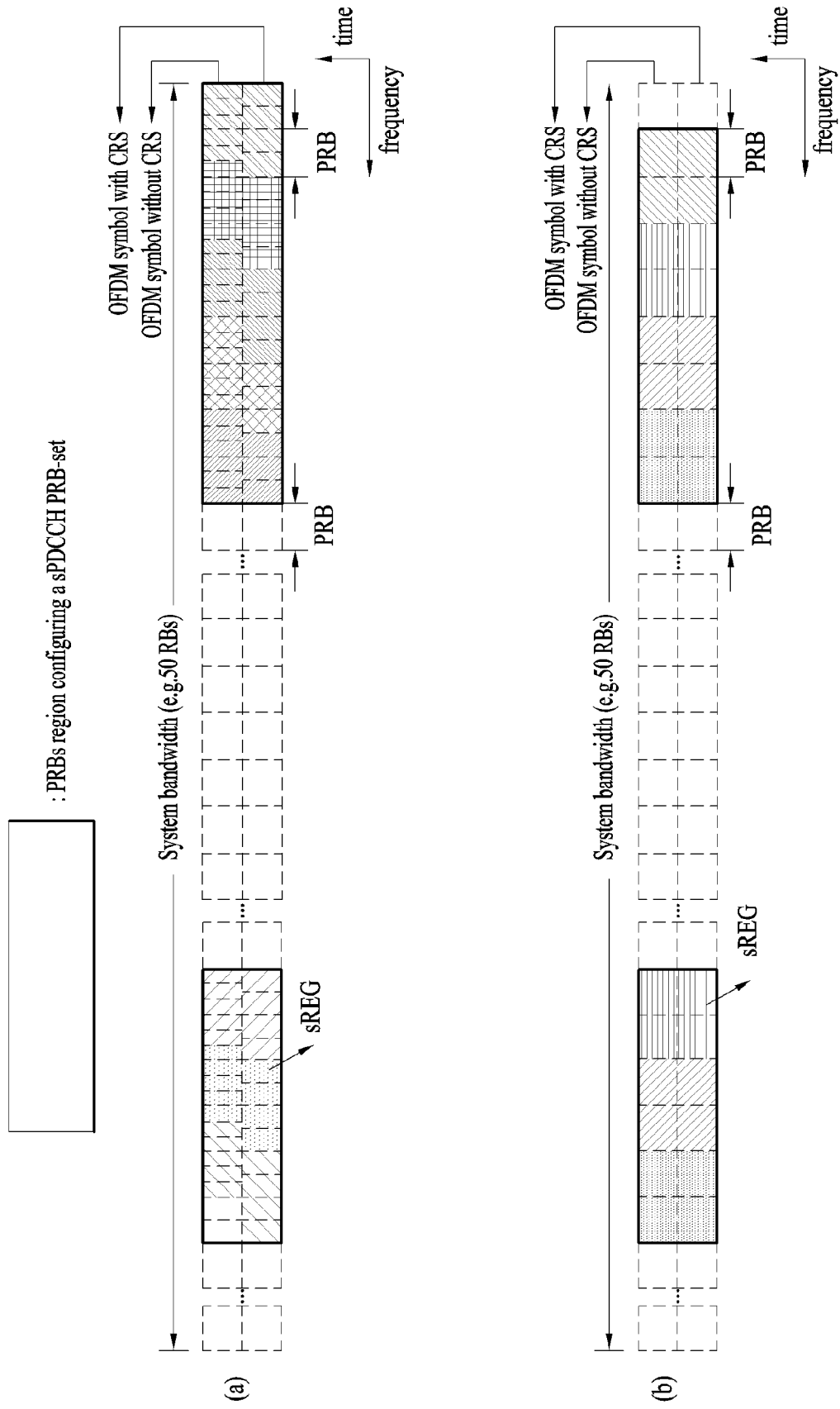

[Fig. 16]
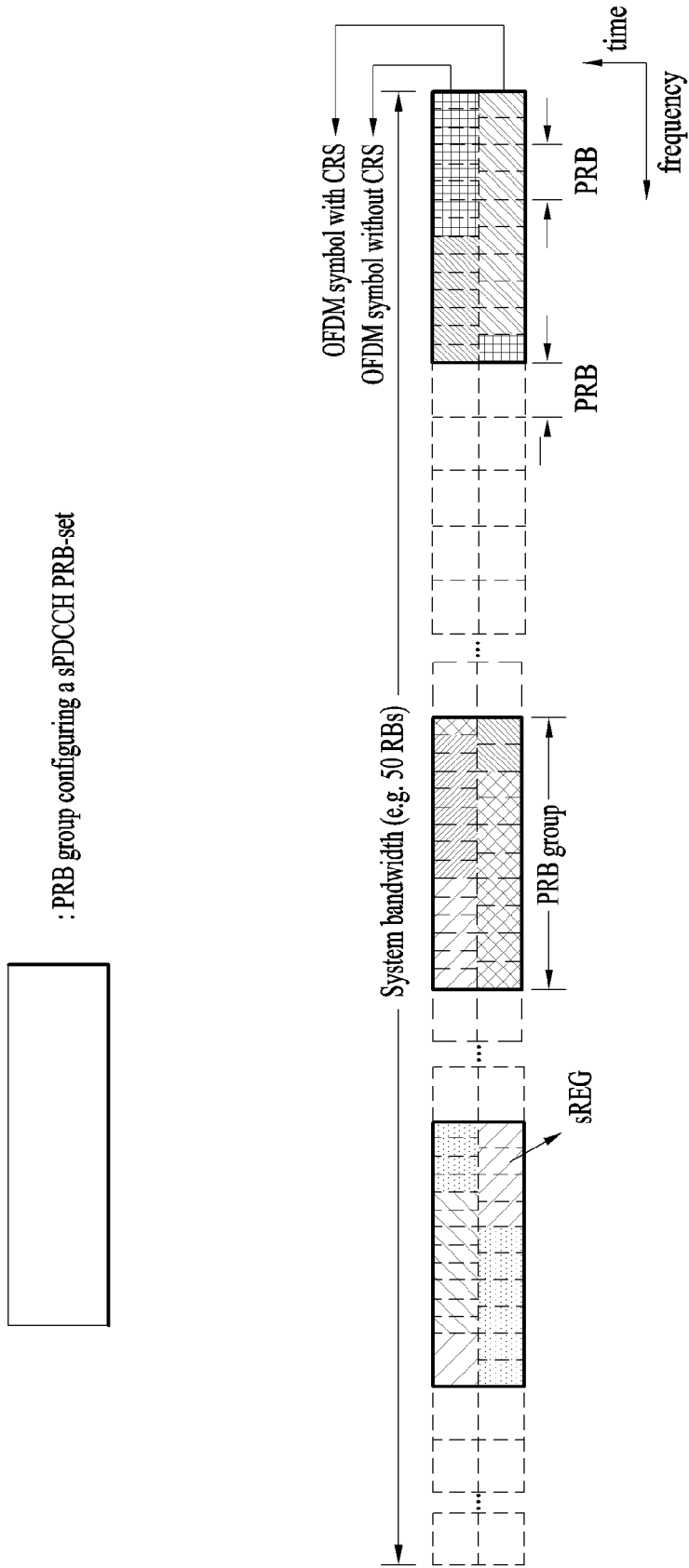

[Fig. 17]
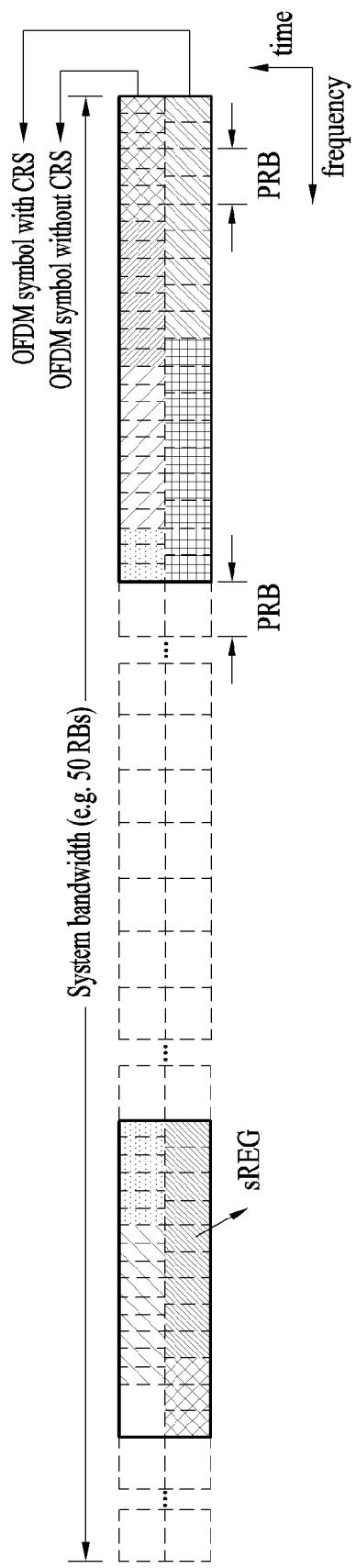

[Fig. 18]
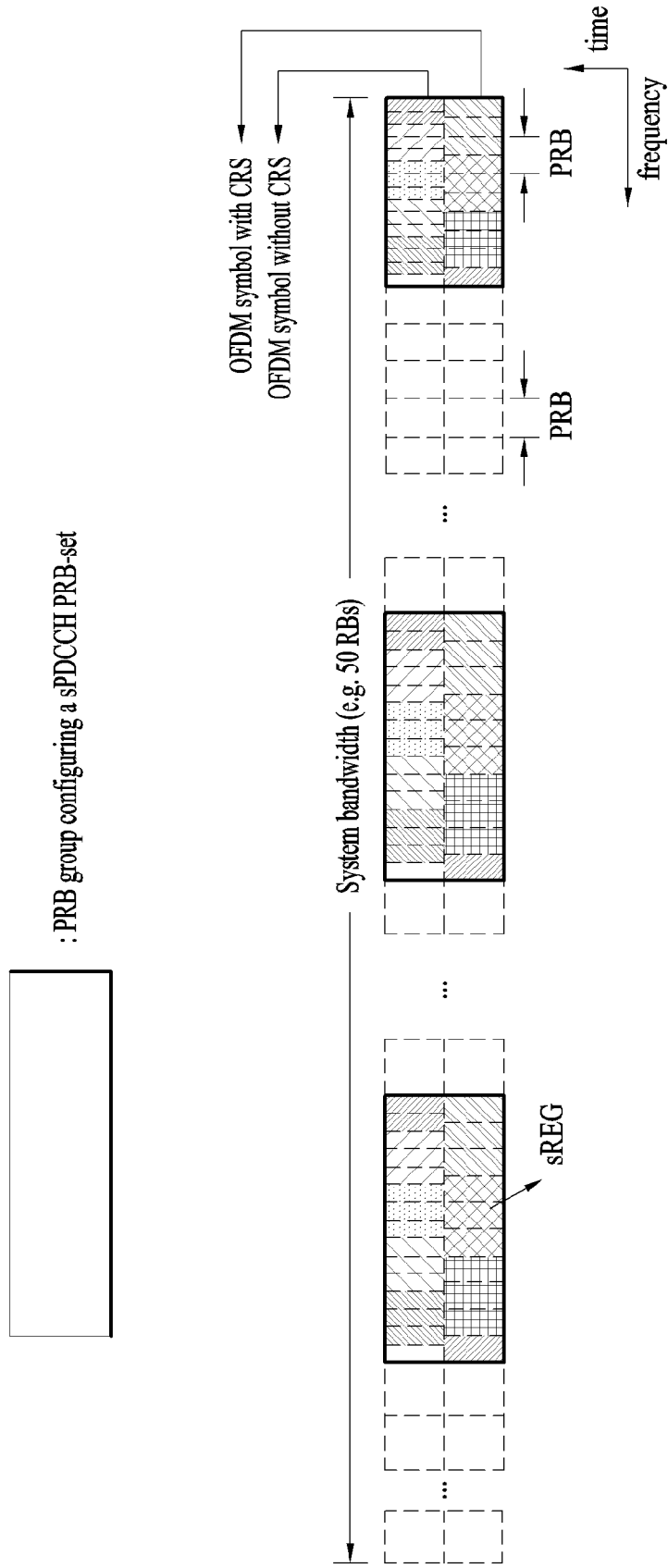

[Fig. 19]
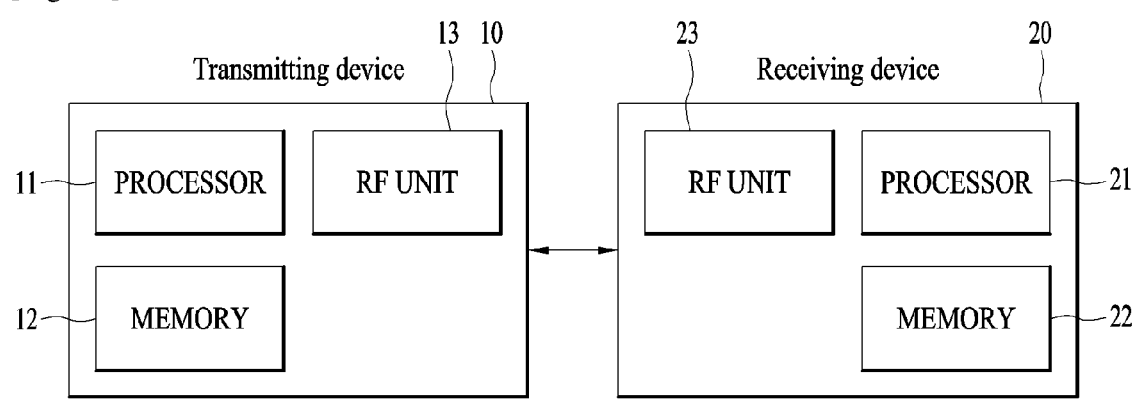

METHOD AND USER EQUIPMENT FOR RECEIVING DOWNLINK CHANNEL, AND METHOD AND BASE STATION FOR TRANSMITTING DOWNLINK CHANNEL

CROSS-REFERENCE TO RELATED APPLICATIONS

This application is the National Stage filing under 35 U.S.C. 371 of International Application No. PCT/KR2017/000047, filed on Jan. 3, 2017, which claims the benefit of U.S. Provisional Applications No. 62/278,431, filed on Jan. 13, 2016, 62/328,017, filed on Apr. 27, 2016 and 62/409,851, filed on Oct. 18, 2016, the contents of which are all hereby incorporated by reference herein in their entirety.

TECHNICAL FIELD

The present invention relates to a wireless communication system, and more particularly, to a method and apparatus for transmitting/receiving a downlink channel.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

The technical objects that can be achieved through the present invention are not limited to what has been particularly described hereinabove and other technical objects not described herein will be more clearly understood by persons skilled in the art from the following detailed description.

Technical Solution

A physical downlink control channel (PDCCH) can be transmitted using one or more resource element groups (REGs) among a plurality of REGs in a transmission time interval (TTI). Each of the plurality of REGs occupies 12 consecutive resource elements (REs) belonging to a physical resource block (PRB) along a frequency domain within an orthogonal frequency division multiplexing (OFDM) symbol with or without a reference signal (RS) in the TTI.

To achieve these objects and other advantages and in accordance with the purpose of the invention, as embodied and broadly described herein, a method for receiving, by a user equipment (UE), a downlink channel is provided. The method comprises: receiving, by the UE, a physical downlink control channel (PDCCH) carrying downlink control information (DCI) in a (transmission time interval, TTI); and receiving, by the UE, a physical downlink shared channel (PDSCH) according to the DCI in the TTI. The PDCCH may be received using one or more resource element groups (REGs) among a plurality of REGs in the TTI. Each of the plurality of REGs occupies 12 consecutive resource elements (REs) belonging to a physical resource block (PRB) along a frequency domain within an orthogonal frequency division multiplexing (OFDM) symbol with or without a reference signal (RS) in the TTI.

In another aspect of the present invention, a method for transmitting, by a base station (BS), a downlink channel is provided. The method comprises: transmitting, by the BS, a physical downlink control channel (PDCCH) carrying downlink control information (DCI) in a (transmission time interval, TTI); and transmitting, by the BS, a physical downlink shared channel (PDSCH) according to the DCI in the TTI. The PDCCH may be transmitted using one or more resource element groups (REGs) among a plurality of REGs in the TTI. Each of the plurality of REGs occupies 12 consecutive resource elements (REs) belonging to a physical resource block (PRB) along a frequency domain within an orthogonal frequency division multiplexing (OFDM) symbol with or without a reference signal (RS) in the TTI.

In another aspect of the present invention, a user equipment (UE) for receiving a downlink channel is provided. The UE comprises: a radio frequency (RF) unit, and a processor configured to control the RF unit. The processor may be configured to: control the RF unit to receive a physical downlink control channel (PDCCH) carrying downlink control information (DCI) in a (transmission time interval, TTI); and control the RF unit to receive a physical downlink shared channel (PDSCH) according to the DCI in the TTI. The PDCCH may be received using one or more resource element groups (REGs) among a plurality of REGs in the TTI. Each of the plurality of REGs occupies 12 consecutive resource elements (REs) belonging to a physical resource block (PRB) along a frequency domain within an orthogonal frequency division multiplexing (OFDM) symbol with or without a reference signal (RS) in the TTI.

In another aspect of the present invention, a base station (BS) for transmitting a downlink channel is provided. The BS comprises: a radio frequency (RF) unit, and a processor configured to control the RF unit. The processor may be configured to: control the RF unit to transmit a physical downlink control channel (PDCCH) carrying downlink control information (DCI) in a (transmission time interval, TTI); and control the RF unit to transmit a physical downlink shared channel (PDSCH) according to the DCI in the TTI. The PDCCH may be transmitted using one or more resource element groups (REGs) among a plurality of REGs in the TTI. Each of the plurality of REGs occupies 12 consecutive resource elements (REs) belonging to a physical resource block (PRB) along a frequency domain within an orthogonal frequency division multiplexing (OFDM) symbol with or without a reference signal (RS) in the TTI.

In each aspect of the present invention, the plurality of REGs may occupy different PRBs or different OFDM symbols from each other.

In each aspect of the present invention, the PDCCH may be not received/transmitted in an RE with the RS among REs belong to the one or more REGs used for reception/transmission of the PDCCH.

In each aspect of the present invention, the TTI may be equal to or shorter than 0.5 ms in a time domain, and configured in a default TTI which is 1 ms in the time domain.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to one embodiment of the present invention, a low cost/complexity UE can perform communication with a BS at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a base station may be reduce.

According to an embodiment of the present invention, a small amount of data may be efficiently transmitted/received.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 1 illustrates the structure of a radio frame used in a wireless communication system.

FIG. 2 illustrates the structure of a downlink (DL)/uplink (UL) slot in a wireless communication system.

FIG. 3 illustrates the structure of a DL subframe used in a wireless communication system.

FIG. 4 illustrates the structure of a UL subframe used in a wireless communication system.

FIG. 5 illustrates configuration of cell specific reference signals (CRSs) and user specific reference signals (UE-RS).

FIG. 6 is a example of a downlink control channel configured in a data region of a DL subframe.

FIG. 7 illustrates the length of a transmission time interval (TTI) which is needed to implement low latency.

FIG. 8 illustrates an example of a short TTI and an example of transmission of a control channel and a data channel in a short TTI.

FIG. 9 illustrates an example of short TTIs configured in a legacy subframe.

FIG. 10 illustrates a self-contained subframe structure.

FIG. 11 illustrates examples of sREG to RE mapping according to the present invention.

FIG. 12 illustrates a method of configuring an sREG according to an embodiment of the present invention.

FIG. 13 illustrates a method of configuring an sREG according to another embodiment of the present invention.

FIG. 14 illustrates a method of configuring an sREG according to another embodiment of the present invention.

FIG. 15 illustrates a method of sCCE to sREG mapping according to the present invention.

FIG. 16 illustrates another method of sCCE to sREG mapping according to the present invention.

FIG. 17 illustrates another method of sCCE to sREG mapping according to the present invention.

FIG. 18 illustrates another method of sCCE to sREG mapping according to the present invention.

FIG. 19 is a block diagram illustrating elements of a transmitting device 10 and a receiving device 20 for implementing the present invention.

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, referring to FIGS. 1 and 3, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

FIG. 2 illustrates the structure of a DL/UL slot structure in a wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs. A set of OFDM symbols available for the PDCCH at a subframe is given by the following Table.

TABLE 3

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframe 1 and 6 for frame structure type 2 | 1, 2 | 2 |
| MBSFN subframes on a carrier supporting PDSCH, configured with 1 or 2 cell-specfic antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB}>10$, the number 1, 2 or 3 of OFDM symbols which are spans of DCI carried by the PDCCH is given by the CFI. For a downlink system bandwidth $N^{DL}_{RB}\leq 10$, the number 2, 3 or 4 of OFDM symbols which are spans of DCI carried by the PDCCH is given by CFI+1. The CFI is coded in accordance with the following Table.

TABLE 4

| CFI | CFI code word <$b_0, b_1, \ldots, b_{31}$> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. The ACK/NACK of 1 bit, hereinafter, HARQ indicator (HI) is coded according to Table 5, where for a positive acknowledgement HI=1 and for a negative acknowledgement HI=0.

TABLE 5

| HI | HI code word <$b_0, b_1, b_2$> |
|---|---|
| 0 | <0, 0, 0> |
| 1 | <1, 1, 1> |

Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

TABLE 6

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

Other DCI formats in addition to the DCI formats defined in Table 6 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode. Table 7 illustrates transmission modes for configuring multi-antenna technology and DCI formats for allowing a UE to perform blind decoding at the corresponding transmission mode. Particularly, Table 6 illustrates a relation between PDCCH and PDSCH configured by C-RNTI (Cell RNTI (Radio Network Temporary Identifier)).

TABLE 7

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | * Non-MBSFN subframe: If the number of PBCH antenna ports is one, Single-antenna port, port 0 is used, otherwise Transmit diversity<br>* MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI format 1A | Common and UE specific by C-RNTI | * Non-MBSFN subframe: If the number of PBCH antenna ports is one, Single-antenna port, port 0 is used, otherwise Transmit diversity<br>* MBSFN subframe: Single-antenna port, port 7 |
|  | DCI format 2D | UE specific by C-RNTI | Up to 8 layer transmission, ports 7-14 or single-antenna port, port 7 or 8 |

Although transmission modes 1 to 10 are listed in Table 7, other transmission modes in addition to the transmission modes defined in Table 7 may be defined.

Referring to Table 7, a UE configured to a transmission mode 9, for example, tries to decode PDCCH candidates of a UE-specific search space (USS) to a DCI format 1A, and tries to decode PDCCH candidates of a common search space (CSS) and the USS to a DCI format 2C. The UE may decode a PDSCH in accordance with DCI based on the DCI format successfully decoded. If DCI decoding from one of a plurality of PDCCH candidates to the DCI format 1A is successfully performed, the UE may decode the PDSCH by assuming that up to 8 layers from antenna ports 7 to 14 are transmitted thereto through the PDSCH, or may decode the PDSCH by assuming that a single layer from the antenna port 7 or 8 is transmitted thereto through the PDSCH.

For example, a transmission mode is semi-statically configured for the UE to allow the UE to receive a PDSCH which is transmitted according to one of a plurality of predefined transmission modes. The UE attempts to decode the PDCCH using only DCI formats corresponding to the transmission mode thereof. In other words, in order to maintain the computational load of the UE according to an attempt of blind decoding at a level lower than or equal to a certain level, not all DCI formats are simultaneously searched by the UE.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}$=floor($N_{REG}/9$). The control region of each serving cell consists of a set of CCEs, numbered from 0 to $N_{CCE,k}-1$, where $N_{CCE,k}$ is the total number of CCEs in the control region of subframe k. A PDCCH consisting of n consecutive CCEs may only start on a CCE fulfilling i mod n=0, where i is the CCE number.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S^{(L)}_k$ at aggregation level L∈{1,2,4,8} is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs. The following Table shows an example of aggregation levels for defining SS.

TABLE 8

| Type | Search space $S^{(L)}_k$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For each serving cell on which PDCCH is monitored, the CCEs corresponding to PDCCH candidates m of the search space $S^{(L)}_k$ are configured by "L*{($Y_k$+m') mod floor($N_{CCE,k}/L$)}+i", where i=0, . . . , L−1. For the common search space m'=m. For the PDCCH UE specific search space, for the serving cell on which PDCCH is monitored, if the monitoring UE is configured with carrier indicator field then m'=m+$M^{(L)}$*$n_{CI}$ where $n_{CI}$ is the carrier indicator field (CIF) value, else if the monitoring UE is not configured with carrier indicator field then m'=m, where m=0, 1, . . . , $M^{(L)}$−1. $M^{(L)}$ is the number of PDCCH candidates to monitor at aggregation level L in the given search space. The carrier indication field value can be the same as a serving cell index (ServCellIndex). For the common search space, $Y_k$ is set to 0 for the two aggregation levels L=4 and L=8. For the UE-specific search space $S^{(L)}_k$ at aggregation level D, the variable $Y_k$ is defined by "$Y_k$=(A·$Y_{k-1}$) mod D", where $Y_{-1}$=$n_{RNTI}$≠0, A=39827, D=65537 and k=floor($n_s/2$). $n_s$ is the slot number within a radio frame.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs may be aggregated on each of a UL and a DL to support a bandwidth of 60 MHz. The respective CCs may be contiguous or non-contiguous in the frequency domain. For convenience, although it has been described that the bandwidth of UL CC and the bandwidth of DL CC are the same as each other and symmetric to each other, the bandwidth of each CC may be independently determined. Asymmetrical carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

A configured cell refers to a cell in which carrier aggregation is performed for a UE based on measurement report from another eNB or UE among cells of an eNB and is configured per UE. The cell configured for the UE may be a serving cell in terms of the UE. For the cell configured for the UE, i.e. the serving cell, resources for ACK/NACK transmission for PDSCH transmission are reserved in advance. An activated cell refers to a cell configured to be actually used for PDSCH/PUSCH transmission among cells configured for the UE and CSI reporting and SRS transmission for PDSCH/PUSCH transmission are performed in the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell.

For reference, a carrier indicator (CI) denotes a serving cell index (ServCellIndex), CI=0 is applied to Pcell. The serving cell index is a short ID used to identify a serving cell. For example, any one of integers from 0 to 'maximum number of carrier frequencies which can be configured for the UE at a time-1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

In legacy systems subject to communication with one node, the UE-RS, CSI-RS, and CRS are transmitted at the same location, and therefore the UE does not consider a situation in which delay spread, Doppler spread, frequency shift, average received power, and received timing differ among the UE-RS port(s), CSI-RS port(s) and CRS port(s0. However, for a communication system to which coordinated Multi-Point (CoMP) communication technology allowing more than one node to simultaneously participate in communication with the UE is applied, the properties may differ among the PDCCH port(s), PDSCH port(s), UE-RS port(s), CSI-RS port(s) and/or CRS port(s). For this reason, the concept of a "quasi co-located antenna port" is introduced for a mode (hereinafter, CoMP mode) in which multiple nodes can participate in communication.

With respect to antenna ports, the term "Quasi co-located (QCL)" or "quasi co-location (QCL)" can be defined as follows: if two antenna ports are QCL, the UE may assume that the large-scale properties of a signal received through one of the two antenna ports can be inferred from the signal received through the other antenna port. The large-scale properties include delay spread, Doppler spread, frequency shift, average received power and/or received timing.

With respect to channels, the term QCL may also be defined as follows: if two antenna ports are QCL, the UE may assume that the large-scale properties of a channel for conveying a symbol on one of the two antenna ports can be inferred from the large-scale properties of a channel for conveying a symbol on the other antenna port. The large-scale properties include delay spread, Doppler spread, Doppler shift, average gain and/or average delay.

One of the two definitions of QCL given above may be applied to the embodiments of the present invention. Alternatively, the definition of QCL may be modified to assume that antenna ports for which QCL assumption is established are co-located. For example, QCL may be defined in a manner that the UE assumes that the antenna ports for which QCL assumption is established are antenna ports of the same transmission point.

For non-quasi co-located (NQC) antenna ports, the UE cannot assume the same large-scale properties between the antenna ports. In this case, a typical UE needs to perform independent processing for each NQC antenna with respect to timing acquisition and tracking, frequency offset estimation and compensation, and delay estimation and Doppler estimation.

On the other hand, for antenna ports for which QCL assumption can be established, the UE performs the following operations:

Regarding Doppler spread, the UE may apply the results of estimation of the power-delay-profile, the delay spread and Doppler spectrum and the Doppler spread for one port to a filter (e.g., a Wiener filter) which is used for channel estimation for another port;

Regarding frequency shift and received timing, after performing time and frequency synchronization for one port, the UE may apply the same synchronization to demodulation on another port;

Further, regarding average received power, the UE may average measurements of reference signal received power (RSRP) over two or more antenna ports.

For example, if the UE receives a specific DMRS-based DL-related DCI format (e.g., DCI format 2C) over a PDCCH/EPDCCH, the UE performs data demodulation after performing channel estimation of the PDSCH through a configured DMRS sequence. If the UE can make an assumption that a DMRS port configuration received through the DL scheduling grant and a port for a specific RS (e.g., a specific CSI-RS, a specific CRS, a DL serving cell CRS of the UE, etc.) port are QCL, then the UE may apply the estimate(s) of the large-scale properties estimated through the specific RS port to channel estimation through the DMRS port, thereby improving processing performance of the DMRS-based receiver.

FIG. 5 illustrates configuration of cell specific reference signals (CRSs) and user specific reference signals (UE-RS). In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

Referring to FIG. 5, the CRS is transmitted through antenna ports p=0, p=0, 1, p=0, 1, 2, 3 in accordance with the number of antenna ports of a transmission mode. The CRS is fixed to a certain pattern within a subframe regardless of a control region and a data region. The control channel is allocated to a resource of the control region, to which the CRS is not allocated, and the data channel is also allocated to a resource of the data region, to which the CRS is not allocated.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Referring to FIG. 5, UE-RSs are transmitted on antenna port(s) p=5, p=7, p=8 or p=7, 8, . . . , υ+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

In the 3GPP LTE-A system, the UE-RSs are defined in a PRB pair. Referring to FIG. 5, in a PRB having frequency-domain index $n_{PRB}$ assigned for PDSCH transmission with respect to p=7, p=8, or p=7, 8, . . . , υ+6, a part of UE-RS sequence r(m) is mapped to complex-valued modulation symbols $a^{(p)}_{k,l}$ in a subframe according to the following equation.

$$a_{k,l}^{(p)} = w_p(l') \cdot r(3 \cdot l' \cdot N_{RB}^{max,DL} + 3 \cdot n_{PRB} + m')$$ [Math Figure 1]

where $w_p(i)$, m' are given as follows.

[Math Figure 2]

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 2)} \\ l' \bmod 2 + 2 + 3\lfloor l'/2 \rfloor & \text{if in a special subframe with configuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in special subframe with configuration 1, 2, 6, or 7 (see Table 2)} \\ 2, 3 & \text{if } n_s \bmod 2 = 1 \text{ and not in special subframe with configuration 1, 2, 6, or 7 (see Table 2)} \end{cases}$$

$$m' = 0, 1, 2$$

where $N_s$ is the slot number within a radio frame and an integer among 0 to 19. The) sequence $\overline{w}_p(i)$ for normal CP is given according to the following equation.

TABLE 9

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7, 8, . . . , υ+6}, the UE-RS sequence r(m) is defined as follows.

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

where c(i) is a pseudo-random sequence defined by a length-31 Gold sequence. The output sequence c(n) of length $M_{PN}$, where n=0, 1, . . . , $M_{PN}$−1, is defined by the following equation.

$$c(n) = (x_1(n+N_C) - x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$ [Math Figure 4]

where $N_C$=1600 and the first m-sequence is initialized with $x_1(0)$=1, $x_1(n)$=0, n=1, 2, . . . , 30. The initialization of the second m-sequence is denoted by $c_{init}=\sum_{i=0}^{30} x_2(i) \cdot 2^i$ with the value depending on the application of the sequence.

In Math Figure 3, the pseudo-random sequence generator for generating c(i) is initialized with $c_{init}$ at the start of each subframe according to the following equation.

$$c_{init}=(\lfloor n_s/2 \rfloor+1) \cdot (2n_{ID}^{(nSCID)}+1) \cdot 2^{16}+n_{SCID} \quad \text{[Math Figure 5]}$$

where the quantities $n^{(i)}_{ID}$, i=0, 1, which is corresponding to $n^{(nSCID)}_{ID}$, are given by a physical layer cell identity $N^{cell}_{ID}$ if no value for a scrambling identity $n^{DMRS,i}_{ID}$ is provided by higher layers or if DCI format 1A, 2B or 2C is used for DCI format associated with the PDSCH transmission, and given by $n^{DMRS,i}_{ID}$ otherwise.

In Math Figure 5, the value of $n_{SCID}$ is zero unless specified otherwise. For a PDSCH transmission on antenna ports 7 or 8, $n_{SCID}$ is given by the DCI format 2B or 2C. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH)

FIG. 6 is a example of a downlink control channel configured in a data region of a DL subframe.

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port p∈{107,108,109,110} as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level $L \in \{1,2,4,8,16,32\}$ is defined by a set of EPDCCH candidates.

For an EPDCCH-PRB-set p, the ECCEs corresponding to EPDCCH candidate m of the search space $ES^{(L)}_k$ are given by the following equation.

$$L\left\{\left(Y_{p,k} + \left\lfloor \frac{m \cdot N_{ECCE,p,k}}{L \cdot M^{(L)}_p} \right\rfloor + b \right) \mod \lfloor N_{ECCE,p,k}/L \rfloor \right\} + i \quad \text{[Math Figure 6]}$$

where i=0, . . . , L−1. $b=n_{CI}$ if the UE is configured with a carrier indicator field for the serving cell on which EPDCCH is monitored, otherwise b=0. $n_{CI}$ is the carrier indicator field (CIF) value, which is the same as a serving cell index (ServCellIndex). m=0, 1, . . . , $M^{(L)}_p-1$, $M^{(L)}_p$ is the number of EPDCCH candidates to monitor at aggregation level L in EPDCCH-PRB-set p. The variable $Y_{p,k}$ is defined by '$Y_{p,k}=(A_p \cdot Y_{p,k-1})$ mod D', where $Y_{p,k-1}=n_{RNTI} \neq 0$, $A_0=39827$, $A_0=39829$, D=65537 and k=floor($n_s/2$). $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by Table 10, the number of EREGs per ECCE is given by Table 11. Table 10 shows an example of supported EPDCCH formats, and Table 11 shows an example of the number of EREGs per ECCE, $N^{EREG}_{ECCE}$. Both localized and distributed transmission is supported.

TABLE 10

| | Number of ECCEs for one EPDCCH, $N^{EPDCCH}_{ECCE}$ | | | |
|---|---|---|---|---|
| | Case A | | Case B | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 11

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

An EPDCCH can use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}-1$. ECCE number n is corresponding to the following EREG(s):

EREGs numbered (n mod $N^{ECCE}_{RB}$)+$jN^{ECCE}_{RB}$ in PRB index floor(n/$N^{ECCE}_{RB}$) for localized mapping, and EREGs numbered floor (n/$N^{Sm}_{RB}$)+$jN^{ECCE}_{RB}$ in PRB indices (n+jmax(1,$N^{Sp}_{RB}/N^{EREG}_{ECCE}$))mod $N^{Sp}_{RB}$ for distributed mapping, where j=0, 1, . . . , $N^{EREG}_{ECCE}-1$, $N^{EREG}_{ECCE}$ is the number of EREGs per ECCE, and $N^{ECCE}_{RB}=16/N^{EREG}_{ECCE}$ is the number of ECCEs per RB pair. The PRB pairs constituting EPDCCH set $S_p$ are assumed to be numbered in ascending order from 0 to $N^{Sp}_{RB}-1$.

Case A in Table 10 applies when:

DCI formats 2, 2A, 2B, 2C or 2D is used and $N^{DL}_{RB}>25$, or any DCI format when $n_{EPDCCH}<104$ and normal cyclic prefix is used in normal subframes or special subframes with configuration 3, 4, 8.

Otherwise case 2 is used. The quantity $n_{EPDCCH}$ for a particular UE is defined as the number of downlink resource elements (k,l) in a PRB pair configured for possible EPDCCH transmission of EPDCCH set $S_0$ and and fulfilling all of the following criteria, they are part of any one of the 16 EREGs in the physical resource-block pair, they are assumed by the UE not to be used for CRSs or CSI-RSs, the index l in a subframe fulfils $l \geq l_{EPDCCHStart}$.

where $l_{EPDCCHStart}$ is given based on higher layer signaling 'epdcch-StartSymbol-r11', higher layer signaling 'pdsch-Start-r11', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by Table 12 with n'=$n_{ECCE,low}$ mod $N^{ECCE}_{RB}$+ $n_{RNTI}$ mod min($N^{ECCE}_{EDPCCH}$, $N^{ECCE}_{RB}$), where $n_{ECCE,low}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for this EPDCCH.

TABLE 12

| | Normal cyclic prefix | | Extended cyclic prefix |
|---|---|---|---|
| n' | Normal subframes, Special subframes, configurations 3, 4, 8 | Special subframes, configurations 1, 2, 6, 7, 9 | Normal subframes, Special subframes, configurations 3, 4, 8 |
| 0 | 107 | 107 | 107 |
| 1 | 108 | 109 | 108 |
| 2 | 109 | — | — |
| 4 | 110 | — | — |

For distributed transmission, each resource element in an EREG is associated with one out of two antenna ports in an alternating manner where p∈{107,109} for normal cyclic prefix and p∈{107,108} for extended cyclic prefix.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

As one method of reducing the cost of an MTC UE, the MTC UE may operate in, for example, a reduced DL and UL bandwidths of 1.4 MHz regardless of the system bandwidth when the cell operates. In this case, a sub-band (i.e., narrowband) in which the MTC UE operates may always be positioned at the center of a cell (e.g., 6 center PRBs), or multiple sub-bands for MTC may be provided in one subframe to multiplex MTC UEs in the subframe such that the UEs use different sub-bands or use the same sub-band which is not a sub-band consisting of the 6 center PRBs.

In this case, the MTC UE may not normally receive a legacy PDCCH transmitted through the entire system bandwidth, and therefore it may not be preferable to transmit a PDCCH for the MTC UE in an OFDM symbol region in which the legacy PDCCH is transmitted, due to an issue of multiplexing with a PDCCH transmitted for another UE. As one method to address this issue, introduction of a control channel transmitted in a sub-band in which MTC operates for the MTC UE is needed. As a DL control channel for such low-complexity MTC UE, a legacy EPDCCH may be used. Alternatively, an M-PDCCH, which is a variant of the legacy PDCCH/EPDCCH, may be introduced for the MTC UE.

A data channel (e.g., PDSCH, PUSCH) and/or control channel (e.g., M-PDCCH, PUCCH, PHICH) may be transmitted across multiple subframes to implement coverage enhancement (CE) of the UE, using a repetition technique or TTI bundling technique. On behalf of the CE, a control/data channel may be transmitted additionally using techniques such as cross-subframe channel estimation and frequency (narrowband) hopping. Herein, the cross-subframe channel estimation refers to a channel estimation technique using not only a reference signal in a subframe having a corresponding channel but also a reference signal in neighboring subframe(s).

The MTC UE may need CE up to, for example, 15 dB. However, not all MTC UEs are present in an environment which requires CE. In addition, the QoS requirements for MTC UEs are not identical. For example, devices such as a sensor and a meter have a low mobility and a small amount of data to transmit/receive and are very likely to be positioned in a shaded area. Accordingly, such devices may need high CE. On the other hand, wearable devices such as a smart watch may have mobility and are very likely to have a relatively large amount of data to transmit/receive and to be positioned in a place other than the shaded area. Accordingly, not all MTC UEs need a high level of CE, and the required capability may depend on the type of an MTC UE.

According to LTE-A Rel-13, CE may be divided into two modes. In a first mode (referred to as CE mode A), transmission may not be repeated or may be repeated only a few times. In a second mode (or CE mode B), many repetitions of transmission are allowed. A mode to enter between the two modes may be signaled to the MTC UE. Herein, parameters that a low-complexity/low-cost UE assumes for transmission/reception of a control channel/data channel may depend on the CE mode. In addition, the DCI format which the low-complexity/low-cost UE monitors may depend on the CE mode. Transmission of some physical channels may be repeated the same number of times regardless of whether the CE mode is CE mode A or CE mode B.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience:

examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

In embodiments of the present invention described below, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

FIG. 7 illustrates the length of a transmission time interval (TTI) which is needed to implement low latency.

Referring to FIG. 7, a propagation delay (PD), a buffering time, a decoding time, an A/N preparation time, an uplink PD, and an OTA (over the air) delay according to a retransmission margin are produced while a signal transmitted from the eNB reaches the UE, the UE transmits an A/N for the signal, and the A/N reaches the eNB. To satisfy low latency, a shortened TTI (sTTI) shorter than or equal to 0.5 ms needs to be designed by shortening the TTI, which is the smallest unit of data transmission. For example, to shorten the OTA delay, which is a time taken from the moment the eNB starts to transmit data (PDCCH and PDSCH) until the UE completes transmission of an A/N for the data to the eNB, to a time shorter than 1 ms, the TTI is preferably set to 0.21 ms. That is, to shorten the user plane (U-plane) delay to 1 ms, the sTTI may be set in the unit of about three OFDM symbols.

While FIG. 7 illustrates that the sTTI is configured with three OFDM symbols to satisfy 1 ms as the OTA delay or U-plane delay, an sTTI shorter than 1 ms may also be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI, namely the channel band or system band of the TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. In addition, in the following description, a physical downlink control channel/physical downlink data channel/physical uplink control channel/physical uplink data channel transmitted in units of the default/main TTI are referred to as a PDCCH/PDSCH/PUCCH/PUSCH, and a PDCCH/PDSCH/PUCCH/PUSCH transmitted within an sTTI or in units of sTTI are referred to as sPDCCH/sPDSCH/sPUCCH/sPUSCH. In the new RAT environment, the numerology may be changed, and thus a default/main TTI different from that for the current LTE/LTE-A system may be used. However, for simplicity, the default/main TTI will be referred to as a TTI, subframe, legacy TTI or legacy subframe, and a TTI shorter than 1 ms will be referred to as an sTTI, on the assumption that the time length of the default/main TTI is 1 ms. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

FIG. 8 illustrates an sTTI and transmission of a control channel and data channel within the sTTI.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 8, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

The present invention is directed to a method of providing a plurality of different services in one system by applying different system parameters according to the services or UEs to satisfy the requirements for the services. In particular, for a service/UE sensitive to latency, an sTTI may be used to send data in a short time and to allow a response to the data to be sent in a short time. Thereby, the latency may be reduced as much as possible. On the other hand, for a service/UE which is less sensitive to latency, a longer TTI may be used to transmit/receive data. For a service/UE which is sensitive to power efficiency rather than to latency, data may be repeatedly transmitted at the same low power or may be transmitted in units of a longer TTI. The present invention proposes a transmission method and multiplexing method for controlling information and data signals to enable the operations described above. The proposed methods are associated with the transmission aspect of a network, the reception aspect of a UE, multiplexing of multiple TTIs in one UE, and multiplexing of multiple TTIs between multiple UEs.

In contrast with the legacy LTE/LTE-A system, in which the length of a TTI is fixed to 1 ms, and thus all UEs and eNB perform signal transmission and reception in units of 1 ms, the present invention supports a system which has multiple TTI lengths, and one UE and one eNB may transmit and receive a signal using multiple TTI lengths. In particular, the present invention proposes a method of enabling the eNB and UE to communicate with each other while supporting various TTI lengths and variability when the TTI length is variable and a method of performing multiplexing for each channel and UE. While description of the present invention below is based on the legacy LTE-/LTE-A system, it is also applicable to systems other than the LTE/LTE-A system or RAT.

FIG. 9 illustrates an example of short TTIs configured in a legacy subframe.

In legacy LTE/LTE-A, if a subframe of 1 ms has a normal CP, the subframe consists of 14 OFDM symbols. If a TTI shorter than 1 ms is configured, a plurality of TTIs may be configured within one subframe. As shown in FIG. 9, each TTI may consist of, for example, 2 symbols, 3 symbols, 4 symbols, or 7 symbols. Although not shown in FIG. 9, a TTI consisting of one symbol may also be considered. If one symbol is one TTI unit, 12 TTIs may be configured in the default TTI of 1 ms, on the assumption that the legacy PDCCH is transmittable within two OFDM symbols. Similarly, when the two leading OFDM symbols are assumed to be the legacy PDCCH region, and two symbols are taken as one TTI unit, 6 TTIs may be configured within the default TTI. If three symbols are taken as one TTI, 4 TTIs may be configured within the default TTI. If 4 symbols are taken as one TTI unit, 3 TTIs may be configured within the default TTI.

If the 7 symbols are configured as one TTI, a TTI consisting of 7 leading symbols including the legacy PDCCH region and a TTI consisting of 7 subsequent symbols may be configured. In this case, if one TTI consists of 7 symbols, a UE supporting the short TTI assumes that the two leading OFDM symbols on which the legacy PDCCH is transmitted are punctured or rate-matched and the data and/or control channels of the UE are transmitted on the five subsequent symbols in the TTI (i.e., the TTI of the first slot) positioned at the leading part of one subframe (i.e., default TTI). On the other hand, the UE may assume that the data and/or control channels can be transmitted on all 7 symbols in a TTI positioned at the rear part of the same subframe (i.e., the TTI of the second slot) without any rate-matched or punctured resource region.

Puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

Two-level DCI may be taken into consideration as a technique for smoothly transmitting sPDCCH within a shortened TTI by reducing the DCI size when data is transmitted/received in the sTTI. Two-level DCI means that DCI for scheduling data is divided into two DCIs and transmitted, or information needed to receive sPDCCH and sPDSCH/sPUSCH is divided into two DCIs and transmitted. In the present invention, these two DCIs are called first DCI and second DCI, or slow DCI and fast DCI. These two DCIs may be transmitted on different (s)PDCCHs or on different control channels.

In this case, the first DCI may provide information that does not change in at least one subframe and may be transmitted on, for example, the sPDCCH/PDCCH or the legacy PDCCH, which is transmitted through the region of legacy PDCCH OFDM symbol(s). The second DCI may be DCI transmitted on the sPDCCH within each sTTI and may contain dynamic configuration information related to data transmission scheduled by the sPDCCH. The first DCI is carried in a legacy PDCCH region and transmitted at most once per subframe, and the second DCI is carried by sPDCCH and transmitted within an sTTI. For example, in the first DCI, transmission resources of the sPDSCH/sPUSCH scheduled in the corresponding subframe may be configured. In the second DCI, the scheduling status of the sPDSCH/sPUSCH and a specific MCS value may be configured. When the first DCI is transmitted, a configuration which the first DCI carries is applied only in the subframe in which the first DCI is transmitted. Alternatively, the UE may determine that the configuration is still valid until the next configuration is transmitted.

Embodiments of the present invention described below may be applied to a new radio access technology (RAT) system in addition to the 3GPP LTE/LTE-A system. As more and more communication devices demand larger communication capacity, there is a need for improved mobile broadband communication compared to existing RAT. Also, massive MTC, which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC, and URLLC (Ultra-Reliable and Low Latency Communication), is being discussed. In the present invention, this technology is referred to as new RAT for simplicity.

<OFDM Numerology>

The new RAT system uses an OFDM transmission scheme or a similar transmission scheme. For example, the new RAT system may follow the OFDM parameters defined in the following table.

TABLE 13

| Parameter | Value |
| --- | --- |
| Subcarrier-spacing (Δf) | 75 kHz |
| OFDM symbol length | 13.33 μs |
| Cyclic Prefix (CP) length | 1.04 μs/0.94 μs |
| System BW | 100 MHz |
| No. of available subcarriers | 1200 |
| Subframe length | 0.2 ms |
| Number of OFDM symbol per Subframe | 14 symbols |

<Self-Contained Subframe Structure>

FIG. 10 illustrates a self-contained subframe structure.

In order to minimize the latency of data transmission in the TDD system, a self-contained subframe structure is considered in the new fifth-generation RAT.

In FIG. 10, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 10, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.52, (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

The sPDCCH referred to in the present invention may include a PDCCH transmitted in the new RAT environment as well as a PDCCH transmitted in an sTTI in the LTE/LTE-A system.

There may be a PDCCH (hereinafter, sPDCCH) transmitted in the sTTI for scheduling a PDSCH (hereinafter, sPDSCH) transmitted/received within a short TTI (hereinafter, sTTI) and PUSCH (hereinafter, sPUSCH) transmitted/received within the sTTI. The present invention proposes methods for resource mapping of the sPDCCH in the sTTI.

The sPDCCH may be transmitted over a part or the entirety of the region of OFDM symbol(s) within the sTTI. The resource element group (REG) constituting the resource region through which the sPDCCH is transmitted may be a short REG (hereinafter, sREG). Generally, a resource element group includes a plurality of resource elements. Similar to the CCE or ECCE in the legacy LTE system, the short CCE (hereinafter, sCCE) consists of a plurality of sREGs.

The present invention proposes that the definition of sREG/sCCE for transmission of sPDCCH also be used for transmission of another DL channel and transmission of a UL channel. For example, the definition of sREG/sCCE for transmission of sPDCCH may be used equally for transmission of the sPUCCH (or a channel on which UCI is transmitted). The sREG/sCCE according to the proposal of the present invention may also be applied to transmission/reception of downlink control and uplink control of the legacy LTE and new RAT.

When the sREG/sCCE according to the present invention is applied to an uplink channel, the REG or CCE (hereinafter, REG/CCE) may be configured, starting from the resource of the last symbol of a slot/subframe or starting from the resource of the last (OFDM/SC-FDM) symbol of UL, and the control region may be configured over a few symbols in the front part from the start resource of the REG/CCE. Alternatively, whether the REG/CCE configuration starts with the first symbol or the last symbol may be configured by a higher layer, or depend on FDD/TDD or on the DL heavy slot or the UL heavy slot. That is, when the REG/CCE according to the present invention is applied to UL starting from the last symbol of a time unit, the REG/CCE applied to the UL may be understood as an REG/CCE mirroring format applied to DL.

A. PRB Resource for sPDCCH Transmission

The sPDCCH may be transmitted/received through some PRB(s) within the overall system bandwidth, so as to be multiplexed with an EPDCCH and PDSCH transmitted in the legacy TTI. The region of PRB(s) in which the sPDCCH may be located may be continuous or discontinuous (or consecutive or non-consecutive) and may be cell-specifically or UE-specifically configured from the SIB or higher layer.

When it is assumed that one sCCE consists of 36 RE resources, similar to the legacy CCE or ECCE, in order to support at least one sPDCCH with aggregation level (AL) 8 or AL 4, the size of the PRB(s) region of the search space in which the sPDCCH is transmittable should be given as shown in the following table. The following table shows the number of PRBs required to support at least one sPDCCH having AL 8 or AL 4 when the number of OFDM symbol(s) on which the sPDCCH may be transmitted in the sTTI is 1, 2, 3, 4, and 7.

TABLE 14

| Number of OFDM symbols for sPDCCH transmission | 1 | 2 | 3 | 4 | 7 |
|---|---|---|---|---|---|
| Minimum PRB size to support AL 8 | 24 PRBs | 12 PRBs | 8 PRBs | 6 PRBs | 4 PRBs |
| Minimum PRB size to support AL 4 | 12 PRBs | 6 PRBs | 4 PRBs | 3 PRBs | 2 PRBs |

Hereinafter, the PRB-set through which the sPDCCH is transmittable (i.e., the PRB-set for monitoring the sPDCCH) is referred to as an sPDCCH PRB-set. According to an embodiment of the present invention, the number of PRBs constituting the sPDCCH PRB-set that may be configured by the UE may be equal to a PRB size shown in Table 14 or a multiple of the PRB size shown in Table 14. For example, if a maximum of AL 8 is supported, the PRB size of the sPDCCH PRB-set may be equal to 12 PRBs or the number of PRBs corresponding to a multiple of 12, if the number of OFDM symbols on which the sPDCCH is transmittable is 2. Alternatively, if a maximum of AL 4 is supported, when the number of OFDM symbols on which the sPDCCH is transmittable is 2, the PRB size of the sPDCCH PRB-set may be equal to 6 PRBs or the number of PRBs corresponding to a multiple of 6.

If the size of the downlink control information decreases, the number of PRBs corresponding to each AL may be reduced. In addition, since UCI have several sizes, the number of PRBs corresponding to each AL may be reduced.

For example, when the payload of the UCI or DCI (hereinafter, UCI/DCI) is 1 bit and/or 2 bits, the minimum PRB for downlink (for AL=8, 4, 2, 1) may be 48 REs (=4 PRBs), 36 REs (=3 PRBs), 24 REs (=2 PRBs), and 12 REs (=1 PRBs), including DM-RSs.

If the payload size of UCI or DCI is less than or equal to 20 bits, the minimum number of PRBs may be 16 for AL 8, 8 for AL 8, 4 for AL 2, and 1 for AL 1, including DM-RSs. This is merely an example, and the actual number of resources for UCI or DCI may be reduced in proportion to the payload size.

According to another aspect of the present invention, the AL used for transmission of the UCI/DCI of the UE may vary with the payload size. For example, when it is assumed that AL 1 is one PRB (including a DM-RS, if the DM-RS is present), the UE may monitor AL 1, AL 2, AL 4, AL 8, AL 16, and AL 32 according to the payload size. For example, the UE may monitor AL 1 for 1 or 2-bit DCI, monitor AL 2, AL 4, AL 8, and AL 16 for DCI whose size is less than or equal to 20 bits, and monitor AL 4, AL 8, AL 16, and AL 32 for DCI whose size is larger than 20 bits. This method is applicable to UL in a similar manner. For example, the UE may transmit 1 or 2-bit UCI at AL 1, UCI having a size less than or equal to 20 bits at AL 2, AL 4, AL 8, or AL 16, and UCI having a size larger than 20 bits at AL 4, AL 8, AL 16, or AL 32, respectively. These AL sets may be applied to each control region, may be restricted through a higher layer, or may be defined in a standard document.

B. sREG to RE Mapping

In this section, a method for determining RE resources constituting an sREG is proposed.

If the sPDCCH is transmitted using the transmission technique of space frequency block coding (SFBC) or SFBC and frequency switched transmit diversity (SFBC+FSTD), REs in which one SFBC pair (or SFBC+FSTD pair) is transmitted are preferably adjacent to each other in the frequency axis. In addition, if the sPDCCH is transmitted using the transmission technique of SFBC or SFBC+FSTD, the number of REs constituting the sREG is preferably a multiple of 4. If the number of REs constituting one sCCE is matched with 36 as in the conventional CCE or ECCE, the number of REs constituting the sREG is preferably a divisor of 36. In view of the above, REs constituting an sREG may be given as follows.

sREG to RE Mapping Method A

One sREG may consist of 4 REs consecutive along the frequency axis in the same OFDM symbol. In this case, one sREG may consist of four consecutive REs except an RE in which CRS and/or DM-RS and/or shared RS are transmitted. Here, the shared RS may refer to an RS used for both demodulation or decoding (hereinafter, demodulation/decoding) of a control channel and demodulation/decoding of a data channel. For example, the RS(s) for the antenna port(s) used for both transmission of the sPDCCH and transmission of the sPDSCH may be the shared RS(s) used for demodulation/decoding of both the sPDCCH and sPDSCH.

Alternatively, one sREG may be configured without CRS RE(s) and/or shared RS RE(s) for transmission of the CRS and/or shared RS, and other RS REs, e.g. UE-specific DMRS RE(s) and the CSI-RS RE(s) may be used as REs for constituting the sREG. Specifically, in this case, the DMRS RE may be an RE constituting the sREG, but the DMRS RE may be rate-matched or punctured when the sPDCCH is actually transmitted.

FIG. 11 illustrates examples of sREG to RE mapping according to the present invention.

Referring to FIG. 11 (a), the sREG is always composed of four REs, except for the RE in which the CRS is transmitted. Accordingly, the number of sREGs in the OFDM symbol varies depending on whether the CRS and/or shared RS are transmitted in the OFDM symbol. In this case, since transmission of the CRS and/or shared RS depends on the OFDM symbol in which the sPDCCH is transmittable, the number of sREGs present in the OFDM symbol in which the sPDCCH is transmittable varies. This means that the number of sREGs present in the OFDM symbol region (hereinafter, sPDCCH OFDM symbol region) in which the sPDCCH is transmittable may vary depending on the position of the sTTI. For example, there are three sREGs per PRB in an OFDM symbol which does not have a CRS, and two sREGs per PRB in an OFDM symbol where CRS port 0/1/2/3 is transmitted.

sREG to RE Mapping Method B

One sREG may consist of 12 REs consecutively arranged in the same OFDM symbol belonging to one PRB along the frequency axis. In this case, one sREG may be always composed of 12 consecutive REs regardless of the RE in which other signal/channels such as CRS, shared RS and/or DMRS, and/or CSI-RS are transmitted. In this case, the CRS RE and the DMRS RE are included in a resource constituting the sREG, but the actual sPDCCH transmission may be rate-matched or punctured in the CRS RE and the DMRS RE. For example, referring to FIG. 11(b), the sREG consists of 12 REs, including CRS RE(s) and/or shared RS RE(s) and/or DMRS RE(s). In this case, the number of sREGs existing in each OFDM symbol is the same for all OFDM symbols regardless of whether the CRS is transmitted in the OFDM symbols. However, even if the sPDCCH is transmitted using the same number of sREGs, the number of REs actually used for transmission of the sPDCCH depends on the number of CRS REs, shared RS REs and/or DMRS REs in the OFDM symbol in which the sPDCCH is transmitted.

When the RS used for demodulation of the control channel is defined as a C-DMRS, the C-DMRS may be transmitted in each sREG, or transmitted in each PRB of the first symbol (the last symbol in the case of UL) or in each CCE. In the case where the C-DMRS is transmitted in each CCE, it may be assumed that the C-DMRS is transmitted in only one OFDM symbol for each PRB. If the control region spans more than M symbols, it may be assumed that the C-DMRS is transmitted every M symbols.

The C-DMRS may be a UE-specific RS or a shared RS. If the C-DMRS is a shared RS, it may be transmitted in each PRB, and it may be assumed that the C-DMRS is transmitted only in one OFDM symbol in each PRB. If the control region spans M symbols or more, it may be assumed that the C-DMRS is transmitted every M symbols.

If the sREG is configured with multiple PRBs or if the CCE is configured with multiple (contiguous or consecutive) PRBs, C-DMRS bundling may be performed in units of K PRBs or a set number of PRBs, or the C-DMRS pattern may be specified in units of K PRBs. Here, C-DMRS bundling refers to precoding the C-DMRS with the same precoding matrix over several PRBs. For example, if the CCE always has 4 contiguous/consecutive sREGs and the sREG is composed of one PRB in the frequency axis, the C-DMRS pattern may be defined across four PRBs. For example, the C-DMRS may be transmitted/received in a pattern of occupying 8 REs per port over 4 PRBs. Alternatively, C-DMRS bundling may be performed over 4 PRBs.

In the present invention, one sREG consists of 12 REs which are consecutive in the frequency axis because one PRB has 12 REs in the frequency axis in the current LTE/LTE-A system. For the new system of different numerology, a different number of consecutive REs may constitute one sREG in the frequency axis. That is, if one PRB consists of S subcarriers, S REs which belong to the same PRB and the same OFDM symbol and are contiguous/consecutive in the frequency axis may constitute one sREG. For example, if one PRB consists of 16 subcarriers in the frequency axis, 16 REs which belong to the same PRB and the same OFDM symbol and are contiguous/consecutive in the frequency axis may constitute one sREG.

In another embodiment of the present invention, if one PRB consists of S subcarriers in the frequency axis, one sREG may be configured with REs contiguous in the same OFDM symbol, where the number of the REs is a multiple of S.

"sREG to RE mapping method B" of the present invention is advantageous in that the boundary of REGs does not depend on presence or absence of the RS or the OFDM symbol. If the number of REGs varies among the OFDM symbols, a complexity issue may arise in the multiplexing process. Further, when the sPDCCH and the sPDSCH are multiplexed within one OFDM symbol on a PRB basis in the frequency axis, if the size of the sREG is not a positive integer multiple of the size of the PRB, a resource may be discarded as it does not belong to the sREG in the PRB to which the sPDCCH is mapped. Additionally, if it is possible to multiplex the PDSCH and the sPDCCH within the same PRB and the same OFDM symbol, the sPDCCH of another UE may be transmitted in the PRB with the PDSCH of a specific UE. Since the specific UE does not know sPDCCH transmission resource region of another UE, the eNB should schedule the sPDSCH of the specific UE by avoiding the PRB resource used for the sPDCCH transmission of the other UE. Considering this case, transmitting the sPDCCH over a full PRB is preferable in terms of efficiency.

sREG to RE Mapping Method C

One sREG may consist of 6 REs contiguous in the same OFDM symbol belonging to one PRB in the frequency axis. In this case, there are two sREGs in the same OFDM symbol in one PRB. More generally, K sREGs may be mapped to the subcarriers in one PRB (in the frequency domain). In this case, one sREG may be invariably configured with 6 contiguous REs regardless of RE(s) in which other signals/channels such as CRS, DMRS, and CSI-RS are transmitted. Specifically, in this case, the CRS RE, the DMRS RE, and the like are included in the resources constituting the sREG. However, in the actual transmission of the sPDCCH, the CRS RE and the DMRS RE included in the sPDCCH may be rate-matched or punctured.

One sREG consists of six consecutive REs in the frequency axis because there are 6*2 REs within one PRB in the frequency axis according to the current LTE/LTE-A system. For a new system with different numerology, a different number of REs consecutive in the frequency axis may constitute one sREG. That is, if one PRB is composed of S subcarriers in the frequency axis, S/2 REs which belong to the same PRB and the same OFDM symbol and are contiguous in the frequency axis may constitute one sREG. For example, if one PRB consists of 16 subcarriers in the frequency axis, one sREG may consist of 8 REs which belong to the same PRB and the same OFDM symbol and are contiguous in the frequency axis.

More generally, if one PRB consists of S subcarriers in the frequency axis, one sREG may consist of REs contiguous along the frequency axis in the same OFDM symbol where the number of the REs is a divisor of S.

Meanwhile, in the new RAT environment, a plurality of subcarrier spacing values may be defined. In this case, different subcarrier spacings may be used for each cell, or signals of different subcarrier spacings may be multiplexed and transmitted in one cell. If a plurality of subcarrier spacings are used in a cell, for example, signals with different subcarrier spacings may be transmitted through frequency division multiplexing (FDM) or time division multiplexing (TDM). The candidate values of subcarrier spacing are, for example, 3.75 kHz, 7.5 kHz, 15 kHz, 30 kHz, 60 kHz, 120 kHz, . . . , and so on.

In this case, one PRB may be defined to represent the same size of frequency region even in environments using different numerologies. For example, if subcarrier spacing of 15 kHz is given, 12 subcarriers may define one PRB in the frequency axis. However, if the subcarrier spacing is 15*X kHz, 12/X subcarriers may define one PRB in the frequency axis.

Alternatively, one sREG may be defined to represent the same size of frequency region in environments using different numerologies. For example, with a subcarrier spacing of 15 kHz is given, 12 REs consecutive in the frequency axis may define one sREG. If a subcarrier spacing of 15*X kHz is given, 12/X REs consecutive in the frequency axis may be defined. More generally, if a subcarrier spacing of A kHz is given, B consecutive REs may define one sREG in the frequency axis. However, if a subcarrier spacing of A*X kHz is given, B/X consecutive REs may define one sREG in the frequency axis.

Various RSs such as DMRS may be defined in one PRB or sREG. In an environment with the same coherence bandwidth, even if the subcarrier spacing increases, the same number of RSs needs to be present in the same frequency region. In this case, even if the subcarrier spacing varies, it is useful to define one PRB and/or sREG to represent the same size of frequency region, rather than defining the same number of subcarriers to constitute one PRB and/or sREG.

This method is effective when multiplexing is used. In other words, multiplexing of signals with different subcarrier spacings may be effectively performed if the size of a frequency region occupied by the PRB and/or sREG is the same regardless of the subcarrier spacing. However, considering that signals of various numerologies are not multiplexed, the sREG may be formed with a fixed number of subcarriers.

C. sREG Configuration Resource Unit and Indexing Method

In this section, a resource unit for constituting an sREG and a method of indexing sREGs in the resource unit for constituting an sREG are proposed.

The PRB or RB referred to in the present invention may represent a new PRB (i.e., sPRB) or RB (i.e., sRB) defined in the sTTI. The sPRB may be composed of OFDM symbols in the sTTI in the time axis and 12*X subcarriers (the area where X existing PRBs are combined) in the frequency axis. In this case, when the number of OFDM symbols constituting the sTTI is T, the value of X may be equal to 12/T or 14/T. Alternatively, when the number of OFDM symbols that may be used for transmission of the sPDCCH is the value of X may be equal to 12/T' or 14/T'. Alternatively, a PRB group may mean a group of sPRBs.

For reference, in the present invention, the sPDCCH PRB-set, i.e., the sPDCCH monitoring RB(s) refers to a set of PRBs constituting one sPDCCH search space, like the EPDCCH PRB-set. In the present invention, the PRB group may be a group of PRBs for sREG indexing, and one or more PRB groups may constitute an sPDCCH PRB-set.

sREG Definition A: sREG is Indexed within the Region of PRB(s) Constituting the sPDCCH PRB-Set FIG. 12 illustrates a method of configuring an sREG according to an embodiment of the present invention.

The sREG may be defined in the region of P PRBs constituting an sPDCCH PRB-set. For example, if the sPDCCH PRB-set consists of P (=6) RBs, as shown in FIG. 12, the sREG may be defined in 6 RBs constituting the sPDCCH PRB-set. If the PRB region in which the sPDCCH is transmittable is the entire band of the system bandwidth, the sREG may be defined in the entire PRBs of the system bandwidth. In this case, sREGs existing in the sPDCCH PRB-set all have different sREG indexes. More specifically, a time/frequency resource (hereinafter, sREG starting resource) that starts configuration of the sREG may be specified in the sPDCCH PRB-set. The sPDCCH-PRB-set may generally be understood as a control region. In this sREG starting resource, the configuration of the sREG is started. The sREG starting resource may differ among UEs, among UE groups or among cell. The entire control region may be wrapped around to cover the entire control region starting from the corresponding sREG starting resource. For example, if the control region consists of PRB0, PRB1, PRB2, and PRB3, and the sREG starting resource is PRB2, sREG resource mapping may be performed starting from PRB2 and proceeded in order of PRB2, PRB3, PRB0 and PRB1. The control region or the sPDCCH-PRB-set may be expressed as a PRB set and the number of OFDM symbols, including both time/frequency resources. If sPDCCH-PRB-set is configured with 6 PRBs over 3 symbols, and the sREG starting resource is the first symbol in the fourth PRB, sREG is configured starting with the fourth PRB. Accordingly, among the first to third PRBs of the first symbol, the third PRB is mapped to the highest sREG index (after wrapping around). The sREG starting resource may be a value varying with time according to a specific hopping function or hashing function. If there is no hopping function and hashing function, it may be assumed that the sREG is mapped starting from the "lowest PRB, the first OFDM symbol for DL" or the "lowest PRB, the last OFDM symbol for UL" according to frequency first and time second mapping. In this case, sREG indexing is performed in order of the fourth PRB, fifth PRB, sixth PRB, first PRB, second PRB, and third PRB in the first symbol.

When a plurality of sREGs exists within P PRBs, the sREGs may be indexed in order of frequency first and time second. In this case, sREG indexing may be performed in ascending order of time for DL and in descending order of time for UL. For example, referring to FIG. 12(a), when the sPDCCH PRB-set consists of six RBs in the frequency axis and two OFDM symbols in the time axis, the indexes of the sREGs may be determined in ascending order of frequency index in the first OFDM symbol within the P(=6) PRBs. After indexing of all sREGs in one OFDM symbol is completed, the indexes of the sREGs in the next OFDM symbol may be subsequently determined in ascending order of frequency index. The numerals marked in FIG. 12 indicate the indexes of the respective sREGs.

As another method, when there are a plurality of sREGs within P PRBs, the sREGs may be indexed in each PRB in order of frequency first and time second. When all the sREGs in one PRB are indexed, sREG indexing may be performed in the next PRB in order of frequency first and time second. That is, the sREGs may be indexed in order of frequency (within a PRB), time, and PRB. For example, as shown in FIG. 12(b), when the sPDCCH PRB-set consists of 6 RBs in the frequency axis and 2 OFDM symbols in the time axis, the indexes of the sREGs may be determined in order of frequency first and time second in the first OFDM symbol region within the P(=6) PRBs. After indexing of all sREGs in one OFDM symbol is completed, the indexes of the sREGs in the next OFDM symbol may be subsequently determined in order of frequency first and time second.

Alternatively, sREG mapping may be performed in units of K PRBs. For example, similar to the case of FIG. 12 (b), sREGs are mapped or indexed in K PRBs by applying frequency first & time second. Thereafter, sREG mapping/indexing is performed in another set of K PRBs. FIG. 12 (c) illustrates a case where an sREG consists of one OFDM symbol in the time axis and one PRB in the frequency axis. Even in the case where multiple sREGs are present on one PRB in one OFDM symbol, frequency first and time second may be applied in one set of K PRBs, and then applied in another set of K PRBs. In this case, the sPDCCH PRB-set, namely, the sPDCCH monitoring RBs may be a multiple of K PRBs. Here, K may be configured by a higher layer, prefixed, or depend on the number of OFDM symbols that may be used for the AL, control region, or sPDCCH transmission.

sREG Definition B: sREGs are Indexed in One PRB

FIG. 13 illustrates a method of configuring an sREG according to another embodiment of the present invention.

sREGs may be defined in each PRB. For example, as shown in FIG. 13, sREGs may be defined in each PRB in order of frequency first and time second. In this case, all the sREGs from the same PRB have different sREG indexes, and sREGs from different PRBs may have the same sREG index.

sREG Definition C: sREGs are Indexed in a PRB-Group

FIG. 14 illustrates a method of configuring an sREG according to another embodiment of the present invention.

The sREG may be defined in a PRB group consisting of a plurality of PRBs. For example, if the PRB group consists of X(=3) PRBs, as shown in FIG. 14, sREGs may be defined in the PRB group. In this case, all the sREGs present in PRB group 2 have different sREG indexes.

When a plurality of sREGs exist in a PRB group consisting of X PRBs, the plurality of sREGs may be indexed in the PRB group in order of frequency first and time second. For example, as shown in FIG. 14(a), when the PRB group consists of three RBs in the frequency axis and two OFDM symbols in the time axis, the indexes of sREGs may be determined in the first OFDM symbol within X(=3) PRBs in ascending order of frequency index. After indexing of all sREGs in one OFDM symbol is completed, the indexes of sREGs may be subsequently determined in the next OFDM symbol region in ascending order of frequency index. The numerals marked in FIG. 14 indicate the indexes of the respective sREGs.

As another method, when a plurality of sREGs exist in a PRB group consisting of X PRBs, the plurality of sREGs may be indexed in one PRB in order of frequency first and time second. After the sREGs in the PRB are indexed, sREG indexing may be performed in the next PRB in order of frequency first and time second. That is, the sREG may be indexed in order of frequency (within a PRB), time, and PRB. For example, as shown in FIG. 14(b), when the PRB group consists of 3 RBs in the frequency axis and 2 OFDM symbols in the time axis, the indexes of the sREGs may be determined in order of frequency first and time second in the first PRB region within the X(=6) PRBs. After indexing of all sREGs in one PRB is completed, the indexes of the sREGs in the next PRB may be subsequently determined in order of frequency first and time second.

In this case, all the sREGs from the same PRB group have different sREG indexes, and sREGs from different PRB groups may have the same sREG index.

D. sCCE to sREG Mapping

In this section, a method of determining a resource unit in which sCCEs are configured and sREGs constituting the sCCE is proposed.

When one sREG consists of 4 REs as proposed in the 'sREG to RE mapping method A' of section B, one sCCE may consist of 9 sREGs. Alternatively, when one sREG consists of 12 REs as proposed in the 'sREG to RE mapping method B' of section B, one sCCE may consist of 3 sREGs.

The method of selecting sREGs to constitute an sCCE may be divided into localized mapping and distributed mapping as follows.

sCCE to sREG Mapping Method 1

FIG. 15 illustrates a method of sCCE to sREG mapping according to the present invention. In particular, FIG. 15 illustrates an sCCE to REG mapping method 1, taking as an example the case where the number of sPDCCH monitoring OFDM symbols is 2. FIG. 15 shows sREGs constituting each sCCE in the sPDCCH PRB-set. In FIG. 15, the sREGs indicated in the same pattern in the sPDCCH PRB-set belong to the same sCCE. An sCCE may consist of a plurality of sREGs located at neighboring positions.

Referring to FIG. 15(a), the sREGs constituting the sCCE may be selected in a PRB in ascending order of frequency index. Once all the sREGs within the same frequency location (i.e., within the same OFDM symbol on the PRB) are selected, the sREGs existing in the next OFDM symbol may be selected in ascending order of frequency index. At this time, once all the sREGs in the PRB are selected, the sREGs present in the next PRB may be selected. That is, sREGs may be selected in order of frequency (within a PRB), time, and PRB.

Referring to FIG. 15(b), when the sREG consists of 12 consecutive REs (including RS RE if an RS exists) as in the sREG to RE mapping method B described above, the sREGs constituting the sCCE are selected in one PRB in ascending order of OFDM symbol index, and then may be selected in the next PRB.

sCCE to sREG Mapping Method 2

FIG. 16 illustrates another method of sCCE to sREG mapping according to the present invention. In particular, FIG. 16 illustrates an sCCE to REG mapping method 2, taking as an example the case where the number of sPDCCH monitoring OFDM symbols is 2. FIG. 16 shows sREGs constituting each sCCE in the sPDCCH PRB-set. In FIG. 16, the sREGs indicated in the same pattern in the sPDCCH PRB-set belong to the same sCCE. An sCCE may consist of a plurality of sREGs located at neighboring positions.

Referring to FIG. 16, the sREGs constituting the sCCE may be selected in a PRB group in ascending order of frequency index. When all the sREGs within the same OFDM symbol are selected, the sREGs existing in the next OFDM symbol region may be selected in ascending order of frequency index. At this time, once all the sREGs in the PRB group are selected, the sREGs present in the next PRB group may be selected. That is, sREGs may be selected in order of frequency (within a PRB group), time, and PRB group.

sCCE to sREG Mapping Method 3

FIG. 17 illustrates another method of sCCE to sREG mapping according to the present invention. In particular, FIG. 17 illustrates an sCCE to REG mapping method 3, taking as an example the case where the number of sPDCCH monitoring OFDM symbols is 2. FIG. 17 shows sREGs constituting each sCCE in the sPDCCH PRB-sets. In FIG. 17, the sREGs indicated in the same pattern in the sPDCCH PRB-sets belong to the same sCCE.

Referring to FIG. 17, the sREGs constituting the sCCE are selected in ascending order of frequency index over the sPDCCH PRB-set(s). Once all the sREGs in the same OFDM symbol are selected, the sREGs present in the next OFDM symbol may be selected in ascending order of frequency index. That is, sREGs may be selected in order of frequency first and time second.

sCCE to sREG Mapping Method 4

The sREGs constituting the sCCE may be distributed in all the sREG resources existing in the sPDCCH PRB-set.

Specifically, the sREGs constituting the sCCE may be uniformly distributed in all the sREG resources existing in the sPDCCH PRB-set. For example, when there are R sREGs in the sPDCCH PRB-set, the sREGs constituting sCCE #m may be sREG #m, sREG #(m+R/9), sREG #(m+2R/9), sREG #(m+3R/9), . . . , sREG #(m+8R/9).

Alternatively, the sREGs constituting the sCCE may be non-uniformly distributed in all the sREG resources existing in the sPDCCH PRB-set sCCE. For example, sCCE may be configured with nine sREGs selected within a total number of sREGs by a specific equation.

sCCE to sREG Mapping Method 6

When the number of sREGs constituting an sCCE is N, N/X sREG resources may be selected in each of X PRBs in the sPDCCH PRB-set to constitute the sCCE. In this case, N/X sREGs selected in one PRB may be 1) consecutive sREGs or 2) non-consecutive sREGs among the sREGs in the corresponding PRB.

sCCE to sREG Mapping Method 7

FIG. 18 illustrates another method of sCCE to sREG mapping according to the present invention. In particular, FIG. 18 shows the sCCE to REG mapping method 7 in the case where the number of sPDCCH monitoring OFDM symbols is 2. FIG. 18 shows sREGs constituting each sCCE in the sPDCCH PRB-set. In FIG. 18, the sREGs indicated by the same pattern in the sPDCCH PRB-set belong to the same sCCE.

When the number of sREGs constituting an sCCE is N, N/X sREG resources may be selected in each of X PRB groups in the sPDCCH PRB-set to constitute the sCCE. The sPDCCH PRB-set refers to the entire region of PRBs constituting the sPDCCH search space. Here, it may be assumed that the PRB group is a set of consecutive PRBs. In this case, N/X sREGs selected in a PRB group may be 1) consecutive sREGs or 2) non-consecutive sREGs among the sREGs existing in the PRB group. These sREGs may be selected in the PRB group in a manner of frequency first and time second, selected in a manner of time first and frequency second, or selected in accordance with the sCCE to sREG mapping method 1 or sCCE to sREG mapping 2 described above. The PRB group may be defined by grouping the PRBs into groups of K PRBs in the PRB-set. That is, K PRBs may form one PRB group. If sREGs are specified one by one for configuration of an sCCE, or the control region size spans over M OFDM symbols, each set of M, K, or M*k sREGs in one PRB group may be specified for the sCCE in one PRB group. One PRB-set may consist of consecutive or non-consecutive PRBs. For example, referring to FIG. 18, 3 PRB groups that are separated from each other may be included in one PRB-set.

After the sCCE regions in which the sPDCCH is transmitted are mapped, RE mapping of the sPDCCH (control channel) in the resource region in which the sPDCCH is transmitted may conform to the frequency first and time second rule. Alternatively, RE mapping may conform to the rule of time first and frequency second. In performing RE mapping of the sPDCCH (control channel), the C-DMRS may be assumed to be transmitted/received at a designated location. If there is no UE-specific C-DMRS in one PRB, the additional C-DMRS may be mapped by puncturing the control channel.

For example, as shown in FIG. 18, for 9 sREG resources constituting the sCCE, sREG resources may be selected in each PRB group of three PRB groups in the sPDCCH PRB-set.

Specifically, the present invention proposes that the mapping method for the sCCE be changed according to situation. Such sCCE mapping method may be included in the above-described sCCE to sREG mapping methods 1 to 7, or may be another method. In the present invention, it is proposed that the sCCE mapping method be determined as follows. For simplicity, in the following description, it is assumed that one of two sCCE mapping schemes is used. The present invention includes determining and using one mapping method among two or more sCCE mapping methods.

In the present invention, it is proposed that sCCE mapping be performed using one of the following two sCCE mapping methods. These mapping methods will be referred to as 'sCCE mapping method A' and 'sCCE mapping method B'. Specifically, sCCE mapping method A refers to a localized mapping method, and sCCE mapping method B refers to a distributed mapping method. The localized mapping method means a method of configuring an sCCE using adjacent frequency resources as much as possible. For example, "sCCE to sREG mapping method 1" or "sCCE to sREG mapping method 2" described above may correspond to the localized mapping method. The distributed mapping method means a method of configuring an sCCE using distributed frequency resources as much as possible. For example, "sCCE to sREG mapping method 3," "sCCE to sREG mapping method 4," "sCCE to sREG mapping method 6," or "sCCE to sREG mapping method 7" may correspond to the distributed mapping method. The sCCE mapping method may be determined using the following methods.

Method 1. The eNB may explicitly announce the sCCE mapping method through configuration of SIB, RRC, DCI, etc.

Method 2. The sCCE mapping method may be determined according to the channel transmission scheme. For example, if a channel is transmitted using localized transmission (e.g., the localized transmission method of EPDCCH or similar method to it), sCCE mapping may be performed using sCCE mapping method A. If a channel is transmitted using distributed transmission (e.g., the distributed transmission method of EPDCCH or similar method to it), sCCE mapping may be performed using sCCE mapping method B.

Method 3. The sCCE mapping method may be determined according to the search space in which the sPDCCH is transmitted. For example, the sCCE mapping method may depend on whether the search space in which the sPDCCH is transmitted is the common search space (CSS) or the UE-specific search space (USS). For example, sCCE mapping method B may be used in the CSS, and sCCE mapping method A may be used in the USS. Alternatively, for example, sCCE mapping method A is used if the sPDCCH is scrambled with the UE ID (e.g., C-RNTI), and sCCE mapping method B may be used if the sPDCCH is scrambled with the UE group ID (e.g., TPC-RNTI) or a cell-specific/cell-common ID (e.g., S-RNTI, RA-RNTI, P-RNTI). The CSS is a search space for transmitting control channels to multiple UEs, namely, for multicasting or broadcasting control channels. Therefore, in the CSS, a transmission method in which all the UEs may receive the control channel well, that is, sCCE mapping method B capable of obtaining diversity gain is more suitable for the CSS than sCCE mapping method A, which is adapted to a specific UE. On the other hand, USS is a search space for transmitting a control channel to a specific UE. Therefore, sCCE mapping method A, in which a control channel may be transmitted to a specific UE by selecting a resource having a good channel condition, precoding, etc., is suitable for the USS.

Method 4. The sCCE mapping method may be determined according to the type of DCI or UCI.

If the DCI is divided into first DCI and second DCI, different sCCE mapping methods may be used, depending on whether the transmitted DCI is the first DCI or second DCI. For example, sCCE mapping method B may be used when the first DCI is transmitted, and sCCE mapping method A may be used when the second DCI is transmitted.

Different sCCE mapping methods may be used depending on the size of the DCI or UCI.

Different sCCE mapping methods may be used depending on the format of the DCI or UCI.

Different sCCE mapping methods may be used depending on whether the A/N transmitted on UL is grant-free A/N or grant-based A/N.

Method 5. The sCCE mapping method may be determined depending on the control channel transmission region or the size of the search space. For example, sCCE mapping method may be determined depending on the number of OFDM symbols used for transmission of the control channel and/or the PRB size. For example, if the number of OFDM symbols used for transmission of the control channel is 1, sCCE mapping method B may be used. If the number of OFDM symbols used for transmission is greater than 1, sCCE mapping method A may be used.

Method 6. In the case of UL, the sCCE mapping method may be determined depending on whether the employed transmission scheme is SC-FDMA or OFDM. For example, in the SC-FDMA transmission scheme, only sCCE mapping method A may be used. In the OFDM transmission method, sCCE mapping method A or B may be used.

Method 7. The sCCE mapping method may be determined depending on the coverage level required for the UE.

Method 8. The sCCE mapping method may be determined depending on the index of a symbol on which the control channel is transmitted and whether the control channel is multiplexed with the data channel. For example, if a control channel is transmitted in the data region, sCCE mapping method A may be used. Otherwise, sCCE mapping method B may be used.

A plurality of control regions may be configured for the UE, and different sCCE mapping methods may be configured or applied according to the control regions. In particular, in the case of UCI transmission, the control regions may exist independently for each UCI format. In this case, different sCCE mapping methods may be configured or applied for each control region.

E. REG-Less sPDCCH Structure

In contrast with the legacy PDCCH and EPDCCH, only the CCE may be defined for the sPDCCH without the concept of REG, and one sPDCCH may be transmitted through one or more CCEs. This method is equally applicable to the case where the sREG is mapped to the CCE on a one-to-one basis. If one-to-one correspondence is established between the sREG and the sCCE, the index of the sREG may be used as the index of the CCE, and the method(s) proposed in section C may be used equally for CCE configuration and indexing. For example, CCE configuration and indexing may be used according to the method(s) configured by replacing the term "sREG" with "CCE" or "sCCE" in section C.

Localized CCE

One CCE may be defined as follows.

One CCE may consist of Y consecutive REs. For example, the value of Y may be 36. The consecutive REs may refer to REs present in a continuous frequency region in the same OFDM symbol. The CCE may consist of REs existing in a PRB-set in which the UE monitors the sPDCCH.

The consecutive REs may refer to Y REs except for the CRS RE and/or DMRS RE.

Alternatively, the consecutive REs may refer to Y REs including the CRS RE and/or DMRS RE. In this case, the RS may be transmitted in the CRS RE and/or DMRS RE, and transmission of sPDCCH may be rate-matched or punctured in the CRS RE and/or DMRS RE.

Alternatively, the consecutive REs may refer to Y REs except for the CRS RE. In this case, the DMRS RE may be included in the CCE resource. In this case, transmission of the sPDCCH may be rate-matched or punctured in the DMRS RE.

Alternatively, one CCE may be configured by OFDM symbol(s) equal in number to the number of OFDM symbols to which the CCE may be mapped among X consecutive RBs. For example, if the number of OFDM symbols to which the CCE may be mapped is 1, the CCE may be mapped to X RBs of one OFDM symbol. Here, one RB may be a resource block consisting of 12 subcarriers or a resource block defined by a different number of subcarriers. This resource block may be based on the assumption of a basic resource block in which data is transmitted, or a resource block for the control channel and a resource block for the data channel may be separately configured. The CRS RE, DM-RS RE, or an RE of another signal/channel in an RB to which the CCE is mapped may be punctured or rate matched. This RB mapping may be continuous or may be a uniform configuration with an offset between RBs. That is, the sCCE may be mapped to consecutive RBs or to non-consecutive RBs having an offset therebetween.

Distributed CCE (1)

Y REs that make up one CCE may be REs from Y/X PRBs, and include X RE(s) from each of the PRBs. For example, one CCE may consist of 36 REs, which may include 4 REs from each of 9 PRBs. Alternatively, for example, a CCE may consist of 36 REs, which may include 3 REs from each of 12 PRBs. The CCE may consist of REs existing in a PRB-set in which the UE monitors the sPDCCH. Here, the values of X and Y may depend on the system bandwidth of the cell. In addition, Y/X may be the number of subcarriers in the RB. In this case, the CCE may be mapped to all RBs in the PRB-set in which the sPDCCH is monitored, in a manner of mapping to the distributed RBs.

Herein, the X REs selected in one PRB may consist of consecutive REs. Here, the consecutive REs may refer to REs existing in a continuous frequency region in the same OFDM symbol.

In this case, the consecutive REs may refer to Y REs except for the CRS RE and/or DMRS RE.

Alternatively, the consecutive REs may refer to Y REs including the CRS RE and/or DMRS RE. In this case, the RS may be transmitted in the CRS RE and/or DMRS RE, and transmission of sPDCCH may be rate-matched or punctured in the CRS RE and/or DMRS RE.

Alternatively, the consecutive REs may refer to Y REs except for the CRS RE. In this case, the DMRS RE may be included in the CCE resource. In this case, transmission of the sPDCCH may be rate-matched or punctured in the DMRS RE.

The scheme in which RBs are distributed, namely, the scheme in which CCEs are mapped to non-consecutive RBs rather than to consecutive RBs may result from the PRB set configuration, but the RBs may be uniformly distributed over the whole bandwidth in which the sPDCCH is transmitted, or may be uniformly distributed by a distribution function. This is also applicable to other methods, for example, the above-described "localized CCE" method or "Distributed CCE (2)", which will be described later.

Distributed CCE (2)

Y REs that make up one CCE may be REs from Y/X PRBs, and include X RE(s) from each of the PRBs. For example, one CCE may consist of 36 REs, which may include 4 REs from each of 9 PRBs. Alternatively, for example, a CCE may consist of 36 REs, which may include 3 REs from each of 12 PRBs. The CCE may consist of REs in a PRB-set in which the sPDCCH is monitored. Here, the values of X and Y may depend on the system bandwidth of the cell.

In this case, the X REs selected in one PRB may consist of non-consecutive REs. For example, when one PRB consists of S subcarriers, a total of X REs, each of which is from every S/X REs among S REs present in the same OFDM symbol, may be selected.

In this case, the REs constituting the CCE may refer to Y REs except for the CRS RE and/or DMRS RE.

Alternatively, the REs constituting the CCE may refer to Y REs including the CRS RE and/or DMRS RE. In this case, the RS may be transmitted in the CRS RE and/or DMRS transmission RE, and transmission of the sPDCCH may be rate-matched or punctured in the CRS RE and/or DMRS RE.

Alternatively, the REs constituting the CCE may refer to Y REs except for the CRS RE. In this case, the DMRS RE may be included in the CCE resource. In this case, transmission of the sPDCCH may be rate-matched or punctured in the DMRS RE.

Such configuration of the CCE may be changed according to the number of OFDM symbols to which the sPDCCH is mapped. For example, in order to reduce the frequency region occupied by the control channel as much as possible for frequency division multiplexing (FDM) of the data channel and the control channel, the CCE mapping may be performed in a time first and frequency second manner. For example, the CCE mapping may be performed in a manner that a CCE corresponding to Y REs is mapped to as many time resources of a first subcarrier as possible, and when all the time resources of the first subcarrier are mapped, CCE mapping in another subcarrier is performed. In the time first and frequency second scheme, mapping of the control channel to time resources is prioritized, and accordingly the control channel occupies fewer frequency resources. For TDM, the CCE mapping scheme, which is opposite to the PDM mapping scheme, may be applied. For example, in the case of TDM, CCE mapping of frequency first and time second may be applied to the control channel.

F. PHICH/PCFICH-Like sPDCCH Structure

When the number of bits of the DCI transmitted on the sPDCCH is very small, the sPDCCH may be transmitted using a method similar to the method for the PHICH and PCFICH. In the present invention, it is proposed that the sPDCCH be transmitted with the transmission structure and process of the PHICH or PCFICH. Specifically or additionally, transmission of the sPDCCH may have the following features.

No CRC

Since a small number of bits is transmitted, the sPDCCH may be transmitted without using CRC.

Simple Channel Coding

In the legacy LTE/LTE-A standard, a channel coding scheme as shown in Table 5 is used for PHICH transmission, and a channel coding method as shown in Table 4 is used for transmission of PCFICH.

In the case of PHICH, repetition coding of ⅓ code rate is used. In case of PCFICH, coding of 1/16 code rate, which turns 2-bit bits of information into a 32-bit codeword, is used.

In case of sPDCCH, the repetition code defined in Table 5 or channel coding defined in Table 4 may be used as in the case of transmission of PHICH or PCFICH.

Resource

The sPDCCH may be transmitted using cell-commonly, cell-specifically, or UE-specifically determined resources. The sPDCCH may be transmitted using, for example, one or more CCEs according to the proposal of the present invention described above. Alternatively, the sPDCCH may be transmitted using cell-commonly, cell-specifically, or UE-specifically determined resources without the concept of CCE/REG.

Alternatively, the UE may receive an sPDCCH by monitoring a plurality of sPDCCH transmission resource candidates (hereinafter, sPDCCH decoding candidates). For example, just as there is a plurality of PHICH resources provided in the LTE/LTE-A system, there may be a plurality of sPDCCH transmission resources in an sTTI. The sPDCCH for a particular UE may be transmitted using one of these resources. In the case where there is a plurality of sPDCCH resources, 1) the plurality of sPDCCH resources may be used in multiplexing and transmitting a plurality of sPDCCHs, and/or 2) the resources used for transmission of the sPDCCH may be used in transmitting additional information. Particularly, when the resource location at which the sPDCCH is transmitted is used to transmit additional information, the entirety or part of the DCI necessary for scheduling the sPDSCH/sPUSCH may be signaled using the sPDCCH transmission resource location. For example, when there are four sPDCCH resources, 2 bits of additional information may be transmitted depending on the sPDCCH resources actually used for transmission of the sPDCCH among the four sPDCCH resources. The additional information may be, for example, resource allocation information about the sPDSCH/sPUSCH scheduled by the sPDCCH. Alternatively, the additional information may be, for example, the size of PRB in which the sPDSCH/sPUSCH is transmitted.

Multiplexing

The following methods may be used to multiplex different sPDCCHs within the region of one sTTI.

Different resource: Multiple sPDCCHs may be multiplexed by being transmitted using different resources (RE, REG, or CCE).

Code division multiplexing (CDM): When a plurality of sPDCCHs are transmitted using the same resource, similar to transmission of a PHICH, they may be multiplexed by CDM using orthogonal sequences.

FIG. 19 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may configure sTTIs in all or some frequency resources of a channel band. The eNB processor may configure one or more sTTIs in a default TTI. The eNB processor may control the eNB RF unit to transmit information indicating a frequency resource in which the sTTI is set and/or information indicating a time resource in which the sTTI is set. The UE processor may control the UE RF unit to receive frequency resource information indicating the frequency resource in which the sTTI is set and/or time resource information indicating the time resource in which the sTTI is set. The UE processor may set the sTTI in all or some frequency resources of the channel band based on the frequency resource information. The UE processor may set one or more sTTIs in a default TTI based on the time resource information.

The eNB processor according to the present invention may control the eNB RF unit to transmit the sPDCCH using one or more sREGs or one or more sCCEs in an sPDCCH monitoring PRB-set in the sPDCCH monitoring OFDM symbol(s).

The eNB processor may be configured to map sREGs to REs according to one of the methods of section B. For example, the eNB processor may map the sREGs to REs consecutive on one PRB in the same sPDCCH monitoring OFDM symbol in the frequency axis. The eNB processor may map the sREGs to REs consecutive on the PRB in the frequency axis regardless of whether the sPDCCH monitoring OFDM symbol has an RS or not. The eNB processor may puncture or rate-match transmission of the sPDCCH in the RS RE.

The eNB processor may configure and index the sREGs according to one of the methods of section D.

The eNB processor may map sCCEs to sREGs according to one of the sCCE to sREG mapping methods of section D. Alternatively, the eNB processor may map the CCE to the REs without the concept of sREG according to one of the methods of section F. The eNB processor may use different sCCE to sREG mapping methods or sCCE to RE mapping methods depending on the explicit configuration, channel transmission scheme, search space type, DCI/UCI type, size of the control region, coverage level, OFDM/SC-FDM symbol index used for transmission of the control channel, or whether the control channel and the data channel are multiplexed or not. For example, the eNB processor may control the eNB RF unit to transmit the sPDCCH using the CCE(s) configured with the localized mapping method in the USS and to transmit the sPDCCH using the CCE(s) configured with the distributed mapping method in the CSS. That is, the eNB processor may control the eNB RF unit to transmit the UE-specific sPDCCH using CCE(s) mapped to as many adjacent REGs or REs as possible in the frequency axis/domain, may control the eNB RF unit to transmit the UE-common sPDCCH using CCE(s) mapped to as many distributed REGs or REs as possible in the frequency axis/domain.

The eNB processor of the present invention may be configured to channel-code the sPDCCH in one of the methods of section F, as in the case of the PHICH or PCFICH, and control the eNB RF unit to transmit the sPDCCH in a resource determined in a manner similar to the PHICH or PCFICH.

The UE processor according to the present invention may monitor the sPDCCH using one or more sREGs or one or more sCCEs in the sPDCCH monitoring PRB-set within the sPDCCH monitoring OFDM symbol(s). The UE processor may control the UE RF unit to receive the sPDCCH using one or more sREGs or one or more sCCEs in the sPDCCH monitoring PRB-set within the sPDCCH monitoring OFDM symbol(s).

The UE processor may be configured to map sREGs to REs according to one of the methods of section B. Alternatively, the UE processor may assume that sREGs are mapped to REs according to one of the methods of section B. For example, the UE processor may map sREGs to REs consecutive on one PRB in the same sPDCCH monitoring OFDM symbol in the frequency axis. The UE processor may map the sREGs to the REs consecutive on the PRB in the frequency axis regardless of whether the sPDCCH monitoring OFDM symbol has an RS or not. The UE processor may assume that transmission of the sPDCCH is punctured or rate-matched in the RS RE. Accordingly, the UE processor may demodulate or decode the sPDCCH, excluding the signal received in the RS RE from demodulation or decoding of the sPDCCH.

The UE processor may configure and index the sREGs according to one of the methods of section D.

The UE processor may map sCCEs to sREGs according to one of the sCCE to sREG mapping methods of section D. Alternatively, the UE processor may map the CCE to the REs without the concept of sREG according to one of the methods of section F. The UE processor may use different sCCE to sREG mapping methods or sCCE to RE mapping methods depending on the explicit configuration, channel transmission scheme, search space type, DCI/UCI type, size of the control region, coverage level, OFDM/SC-FDM symbol index used for transmission of the control channel, or whether the control channel and the data channel are multiplexed or not. For example, the UE processor may demodulate/decode the sPDCCH, assuming that the sPDCCH is transmitted using the CCE(s) configured with the localized mapping method in the USS and that the sPDCCH is transmitted using the CCE(s) configured with the distributed mapping method in the CSS. The UE processor may demodulate/decode the sPDCCH, assuming that the UE-specific sPDCCH is transmitted using CCE(s) mapped to as many adjacent REGs or REs as possible in the frequency axis/domain and that the common sPDCCH is transmitted using CCE(s) mapped to as many distributed REGs or REs as possible in the frequency axis/domain.

The UE processor of the present invention may control the UE RF unit to receive the sPDCCH in one of the methods of section F, as in the case of the PHICH or PCFICH. The UE processor may demodulate/decode the sPDCCH, assuming that the sPDCCH is channel-coded and transmitted in a manner similar to the PHICH or PCFICH.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

What is claimed is:

1. A method for wireless communication, the method comprising:
    receiving, at a user equipment (UE), a physical downlink control channel (PDCCH) carrying downlink control information (DCI) on a resource block (RB) set configured for PDCCH reception; and
    receiving, at the UE, a physical downlink shared channel (PDSCH) according to the DCI,
    wherein each RB of the RB set is defined by 12 consecutive subcarriers in a frequency domain,
    wherein each resource element group (REG) of multiple REGs is composed of 12 consecutive resource elements (REs) along the frequency domain during one orthogonal frequency division multiplexing (OFDM) symbol, wherein each REG of the multiple REGs equals an RB in the frequency domain,
    wherein the PDCCH consists of one or more consecutive control channel elements (CCEs), and
    wherein each of the one or more consecutive CCEs consists of the multiple REGs among which N REGs are selected in an ascending order of an OFDM symbol index on an RB within N OFDM symbols used for the PDCCH reception on the RB set and then next N REGs are selected in the ascending order of the OFDM symbol index on a next RB within the N OFDM symbols used for the PDCCH reception on the RB set, where N is a positive integer greater than 1.

2. The method according to claim 1, wherein each REG of the multiple REGs occupies a respectively different RB or a respectively different OFDM symbol.

3. The method according to claim 1, wherein the PDCCH is received in a transmission time interval (TTI) which is equal to or shorter than 0.5 ms in a time domain.

4. A method for wireless communication, the method comprising:
    transmitting, from a base station (BS), a physical downlink control channel (PDCCH) carrying downlink control information (DCI) on a resource block (RB) set configured for PDCCH transmission; and
    transmitting, from the BS, a physical downlink shared channel (PDSCH) according to the DCI, wherein each RB of the RB set is defined by 12 consecutive subcarriers in a frequency domain,
    wherein each resource element group (REG) of multiple REGs is composed of 12 consecutive resource elements (REs) along the frequency domain during one orthogonal frequency division multiplexing (OFDM) symbol, wherein each REG of the multiple REGs equals an RB in the frequency domain,
    wherein the PDCCH consists of one or more consecutive control channel elements (CCEs), and
    wherein each of the one or more consecutive CCEs consists of the multiple REGs among which N REGs are selected in an ascending order of an OFDM symbol index on an RB within N OFDM symbols used for the PDCCH reception on the RB set and then next N REGs are selected in the ascending order of the OFDM symbol index on a next RB within the N OFDM symbols used for the PDCCH reception on the RB set, where N is a positive integer greater than 1.

5. The method according to claim 4, wherein each REG of the multiple REGs occupies a respectively different RB or a respectively different OFDM symbol.

6. The method according to claim 4, wherein the PDCCH is transmitted in a transmission time interval (TTI) which is equal to or shorter than 0.5 ms in a time domain.

7. A user equipment (UE), comprising:
    a transceiver,
    a processor, and
    a memory operably connectable to the processor and storing instructions that, when executed, cause the processor to perform operations comprising:
    receiving, via the transceiver, a physical downlink control channel (PDCCH) carrying downlink control information (DCI) on a resource block (RB) set configured for PDCCH reception; and
    receiving, via the transceiver, a physical downlink shared channel (PDSCH) according to the DCI,
    wherein each RB of the RB set is defined by 12 consecutive subcarriers in a frequency domain,
    wherein each resource element group (REG) of multiple REGs is composed of 12 consecutive resource elements (REs) along the frequency domain during one orthogonal frequency division multiplexing (OFDM) symbol, wherein each REG of the multiple REGs equals an RB in the frequency domain,
    wherein the PDCCH consists of one or more consecutive control channel elements (CCEs), and
    wherein each of the one or more consecutive CCEs consists of the multiple REGs among which N REGs are selected in an ascending order of an OFDM symbol index on an RB within N OFDM symbols used for the PDCCH reception on the RB set and then next N REGs are selected in the ascending order of the OFDM symbol index on a next RB within the N OFDM symbols used for the PDCCH reception on the RB set, where N is a positive integer greater than 1.

8. The UE according to claim 7, wherein each REG of the multiple REGs occupies a respectively different RB or a respectively different OFDM symbol.

9. The UE according to claim 7, wherein the PDCCH is received in a transmission time interval (TTI) which is equal to or shorter than 0.5 ms in a time domain.

10. A base station (BS), comprising:
a transceiver,
a processor, and a memory operably connectable to the processor and storing instructions that, when executed, cause the processor to perform operations comprising:
transmitting, via the transceiver, a physical downlink control channel (PDCCH) carrying downlink control information (DCI) on a resource block (RB) set configured for PDCCH transmission; and
transmitting, via the transceiver, a physical downlink shared channel (PDSCH) according to the DCI,
wherein each RB of the RB set is defined by 12 consecutive subcarriers in a frequency domain,
wherein each resource element group (REG) of multiple REGs is composed of 12 consecutive resource elements (REs) along the frequency domain during one orthogonal frequency division multiplexing (OFDM) symbol,
wherein each REG of the multiple REGs equals an RB in the frequency domain,
wherein the PDCCH consists of one or more consecutive control channel elements (CCEs), and
wherein each of the one or more consecutive CCEs consists of the multiple REGs among which N REGs are selected in an ascending order of an OFDM symbol index on an RB within N OFDM symbols used for the PDCCH reception on the RB set and then next N REGs are selected in the ascending order of the OFDM symbol index on a next RB within the N OFDM symbols used for the PDCCH reception on the RB set, where N is a positive integer greater than 1.

11. The BS according to claim 10, wherein each REG of the multiple REGs occupies a respectively different RB or a respectively different OFDM symbol.

12. The BS according to claim 10, wherein the PDCCH is transmitted in a transmission time interval (TTI) which is equal to or shorter than 0.5 ms in a time domain.

13. The method according to claim 1, wherein at least one REG of the multiple of REGs includes only three REs for reference signals (RSs).

14. The method according to claim 4, wherein at least one REG of the multiple REGs includes only three REs for reference signals (RSs).

15. The UE according to claim 7, wherein at least one REG of the multiple REGs includes only three REs for reference signals (RSs).

16. The BS according to claim 10, wherein at least one REG of the multiple REGs includes only three REs for reference signals (RSs).

* * * * *